United States Patent
Ji et al.

(10) Patent No.: US 11,631,841 B2
(45) Date of Patent: Apr. 18, 2023

(54) METHODS OF PREPARING AN ELECTRODE MATERIAL WITH METAL ALKOXIDE OR METAL ARYLOXIDE

(71) Applicant: Enevate Corporation, Irvine, CA (US)

(72) Inventors: Liwen Ji, San Diego, CA (US); Rahul R. Kamath, Mission Viejo, CA (US); Ian Russell Browne, Orange, CA (US); Benjamin Yong Park, Mission Viejo, CA (US)

(73) Assignee: Enevate Corporation, Irvine, CA (US)

(*) Notice: Subject to any disclaimer, the term of this patent is extended or adjusted under 35 U.S.C. 154(b) by 255 days.

(21) Appl. No.: 16/722,746

(22) Filed: Dec. 20, 2019

(65) Prior Publication Data
US 2021/0193987 A1 Jun. 24, 2021

(51) Int. Cl.
| | |
|---|---|
| *H01M 10/0525* | (2010.01) |
| *H01M 4/133* | (2010.01) |
| *H01M 4/1395* | (2010.01) |
| *H01M 4/38* | (2006.01) |
| *H01M 4/04* | (2006.01) |
| *H01M 4/60* | (2006.01) |
| *H01M 4/131* | (2010.01) |

(52) U.S. Cl.
CPC ....... *H01M 4/1395* (2013.01); *H01M 4/0404* (2013.01); *H01M 4/131* (2013.01); *H01M 4/133* (2013.01); *H01M 4/386* (2013.01); *H01M 4/60* (2013.01); *H01M 10/0525* (2013.01)

(58) Field of Classification Search
CPC .. H01M 4/1395; H01M 4/0404; H01M 4/131; H01M 4/133; H01M 4/386; H01M 4/60; H01M 10/0525
See application file for complete search history.

(56) References Cited

U.S. PATENT DOCUMENTS

| | | | | |
|---|---|---|---|---|
| 10,026,960 | B2* | 7/2018 | Lee | H01M 4/525 |
| 2006/0147797 | A1* | 7/2006 | Wu | H01M 4/0428 |
| | | | | 429/218.1 |
| 2009/0136855 | A1* | 5/2009 | Yamaguchi | H01M 10/0569 |
| | | | | 429/212 |
| 2012/0244391 | A1* | 9/2012 | Yushin | H01M 4/386 |
| | | | | 427/78 |
| 2013/0295451 | A1* | 11/2013 | Miki | H01M 4/04 |
| | | | | 252/500 |

(Continued)

FOREIGN PATENT DOCUMENTS

EP 0378414 * 7/1990

OTHER PUBLICATIONS

Wark et. al. Material Research Society Proceeding (Better Ceram Chem. 4), p. 61-72 (Abstract). (Year: 1990).*

*Primary Examiner* — Alexander Usyatinsky
(74) *Attorney, Agent, or Firm* — McAndrews, Held & Malloy, Ltd.

(57) ABSTRACT

Methods of preparing an electrode material can include providing silicon particles, forming a mixture comprising the silicon particles dispersed in a solvent, and forming a suspension by adding metal alkoxide or metal aryloxide to the mixture. The methods can also include evaporating the solvent in the suspension to form metal alkoxide or metal aryloxide coated silicon particles. The methods can further include heating the coated silicon particles to form metal oxide coated silicon particles.

17 Claims, 13 Drawing Sheets

(56) References Cited

U.S. PATENT DOCUMENTS

| | | | |
|---|---|---|---|
| 2015/0162617 A1* | 6/2015 | Liu ..................... | H01M 4/0471 427/215 |
| 2016/0049646 A1* | 2/2016 | Fujiki ................... | H01M 4/366 429/231.95 |
| 2018/0269519 A1* | 9/2018 | Jo ........................... | C01B 33/02 |

* cited by examiner

METHODS OF PREPARING AN ELECTRODE MATERIAL WITH METAL ALKOXIDE OR METAL ARYLOXIDE

BACKGROUND

Field

The present application relates generally to electrode material. In particular, the present application relates to methods of preparing electrode material comprising silicon with a metal oxide precursor, such as metal alkoxide or metal aryloxide.

Description of the Related Art

A lithium ion (Li-ion) battery typically includes a separator and/or electrolyte between an anode and a cathode. In one class of batteries, the separator, cathode, and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Silicon (Si) based electrodes (e.g., anodes) are attractive compared to graphite-based electrodes for Li-ion batteries due to Si's very high gravimetric (3579 mAh/g vs. 372 mAh/g for graphite) and volumetric capacities (2194 mAh/L vs. 890 mAh/L for graphite). In addition, Si-based electrodes have a low lithiation/delithiation voltage plateau centered at about 0.3-0.4V vs. Li/Li$^+$, which allows them to maintain a potential that can reduce and/or avoid undesirable Li plating and potential dendrite formation. While theoretically interesting, achieving stable cycle life for Si-based electrodes can be a challenge due to the high volume changes and unstable solid electrolyte interphase (SEI) layer. In liquid electrolytes, expansion and shrinkage of Si particles upon charge-discharge cycling can cause repetitive exposure of fresh surface, which results in unceasing formation and thickening of the SEI layer. As a result, long-term cycling stability with Si anodes (e.g., high content Si anodes such as with >50% Si) paired with different high-capacity and high voltage cathodes, such as Lithium Nickel Cobalt Manganese Oxide (NCM) or Lithium Nickel Cobalt Aluminum Oxide (NCA), Lithium Manganese Nickel Oxide (LNMO), Lithium Cobalt Oxide (LCO), Li, and Mn-rich layered oxides $xLi_2MnO_3 \cdot (1-x)LiMO_2$ (LR-NMC), etc., has not yet been sufficiently demonstrated. The existing work on Si anodes//NCM or NCA cathode systems also do not yet meet the requirements for commercial applications because of their unsatisfactory performance or serious challenges associated with cost, scale-up, and safety.

SUMMARY

In certain implementations, a method of preparing an electrode material is provided. The method can include providing silicon particles, forming a mixture comprising the silicon particles dispersed in a solvent, and forming a suspension by adding metal alkoxide or metal aryloxide to the mixture. The method can also include evaporating the solvent in the suspension to form metal alkoxide or metal aryloxide coated silicon particles. The method can further include heating the coated silicon particles to form metal oxide coated silicon particles.

In some instances, the metal alkoxide and metal aryloxide can be represented by $M(OR)_x$, where M can be a metal, and each R can be independently selected from the group consisting of methyl (Me), ethyl (Et), n-propyl (Pr$''$), iso-propyl (Pr$^i$), n-butyl (Bu$''$), sec-butyl (Bu$^s$), iso-butyl (Bu$^i$), and tert-butyl (Bu$^t$), phenyl, naphthyl, tolyl, and xylyl. In some instances, x can be 1, 2, 3, 4, or 5.

In some instances, M can be a Group 1 metal.

In some instances, M can be independently selected from the group consisting of Ti, Al, and Nb. For example, in some instances, the metal alkoxide can be $Ti(OR)_4$, $Al(OR)_3$, or $Nb(OR)_5$.

In some instances, M can be a bivalent metal, a trivalent metal, a quadrivalent metal, a quinquevalent metal, or a sexavalent metal.

For example, the bivalent metal can be selected from the group consisting of beryllium (Be) (II), magnesium (Mg) (II), calcium (Ca) (II), strontium (Sr) (II), barium (Ba) (II), iron (Fe) (II), cadmium (Cd) (II), cobalt (Co) (II), nickel (Ni) (II), manganese (Mn) (II), copper (Cu) (II), mercury (Hg) (II), and samarium (Sm) (II).

As another example, the trivalent metal can be selected from the group consisting of chromium (Cr) (III), boron (B) (III), lanthanum (Ln) (III), iron (Fe) (III), gallium (Ga) (III), molybdenum (Mo) (III), tungsten (W) (III), yttrium (Y) (III), and indium (In) (III).

As another example, the quadrivalent metal can be selected from the group consisting of silicon (Si) (IV), tin (Sn) (IV), cerium (Ce) (IV), zirconium (Zr) (IV), germanium (Ge) (IV), selenium (Se) (IV), thorium (Th) (IV), lead (Pb) (IV), and hafnium (Hf) (IV).

As another example, the quinquevalent metal can be selected from the group consisting of phosphorus (P) (V), arsenic (As) (V), antimony (Sb) (V), vanadium (V) (V), tantalum (Ta) (V), and uranium (U) (V).

As another example, the sexavalent metal can be molybdenum (Mo) (VI) or tungsten (W) (VI).

In some instances, the metal alkoxide can be $LiNb(OEt)_6$ where Et is ethyl, and where the metal oxide is $LiNbO_3$. In some instances, the metal alkoxide can be $ZnSn(OEt)_6$ where Et is ethyl, and where the metal oxide is $ZnSnO_3$.

In some instances, the metal oxide can be a mixed metal oxide.

In some instances, the metal oxide can be a transition metal oxide.

In some implementations, a method of forming an electrode is provided. The method can include providing metal oxide coated silicon particles, forming an electrode active material precursor comprising the metal oxide coated silicon particles dispersed in a carbon precursor, and coating the electrode active material precursor onto a substrate to form a green active material film. The method can also include drying the green active material film and heating the green active material film to form a silicon-carbon composite electrode material film.

In some instances, the carbon precursor can comprise polyamic acid resin.

In some instances, the electrode active material precursor can further comprise graphite particles.

In some instances, the electrode can be an anode.

In some implementations, a method of making an electrochemical device is provided. The method can include providing a first electrode comprising a silicon-carbon composite electrode material film, providing a second electrode, and providing electrolyte.

In some instances, the electrochemical device can be a lithium-ion battery.

In some instances, the second electrode can be selected from the group consisting of:

Ni-rich $LiNi_xCo_yMn_zO_2$, wherein $0 \leq x, y, z < 1$,

Ni-rich $Li[Ni_xCo_yAl_{1-x-y}]O_2$, wherein $0 \leq x, y, z < 1$,

Li-rich $xLi_2MnO_3 \cdot (1-x)LiNi_aCo_bMn_cO_2$, wherein $0 < x < 1$ and $a+b+c=1$, Ni-rich $LiNi_{1-x}M_xO_2$, wherein M comprises Co, Mn, or Al, Li-rich layered $LiNi_{1+x}M_{1-x}O_2$, wherein M comprises Co, Mn, or Ni, a high-voltage spinel $LiNi_{0.5}Mn_{1.5}O_4$, and a polyanionic compound comprising a phosphate, a sulfate, or a silicate.

In various implementations, a method of preparing an electrode is provided. The method can include providing an electrode comprising silicon. The method can also include exposing the electrode to a solution comprising a metal alkoxide or metal aryloxide in a solvent. The method can further include heating the electrode to convert the metal alkoxide or metal aryloxide into metal oxide.

In some instances, the electrode can be a silicon-dominant electrode.

In some instances, the electrode can be a silicon-carbon composite film.

In some instances, the electrode can comprise silicon particles coated on a current collector.

In some instances, exposing the electrode to the solution can comprise dip-coating the electrode in the solution.

In some instances, heating the electrode can comprise annealing the electrode.

In various implementations, a method of preparing an electrode is provided. The method can include forming a mixture comprising silicon particles and metal alkoxide or metal aryloxide. The method can also include coating the mixture on a current collector. The method can further include heating the mixture to convert the metal alkoxide or metal aryloxide into metal oxide.

In some instances, the mixture can be coated on the current collector with a binder.

In some instances, the mixture can comprise a solvent.

In some instances, the mixture can be a dry mixture.

In some instances, heating the mixture can comprise annealing the mixture.

DETAILED DESCRIPTION

The surface properties of Si particles can be closely related to the SEI structure, electrode stability, and electrochemical cycling in Si electrode-based Li-ion batteries. Various implementations described herein use metal alkoxide and/or metal aryloxide as a precursor to coat a multifunctional layer of metal oxide engineered on the surface of Si particles. In general, metal alkoxide and/or metal aryloxide can attach to the surface of Si material and convert to metal oxide after heat treatment. The coating layer on the surface of Si particles can help provide a stronger (e.g., robust) physical support, buffer stress, preserve the mechanical structure of Si particles, and reduce and/or suppress volume expansion/extraction, leading to improved electrochemical performance and safety of Si-electrode-based Li-ion batteries. In addition, coating a metal oxide shell on the outside of the Si material can offer a static surface for the formation of a thin and stable artificial SEI layer, which can help preserve the electrode from irreversible reaction with the electrolyte. For example, the coating can help protect electronic conduction pathways. When Li enters the metal oxide layer during the initial charge, the layer may act as a migration path for the Li-ions. The coating can also reduce and/or inhibit side reactions between the electrolyte and active Si phase, and control the growth of the SEI layer during prolonged charging/discharging processes. In this way, the metal oxide may surround Si particles and reduce and/or prevent pulverization during cycling. As a result, electrochemical performance (e.g., capacity retention) in Si electrode-based Li-ion batteries can be improved.

Figure 1:
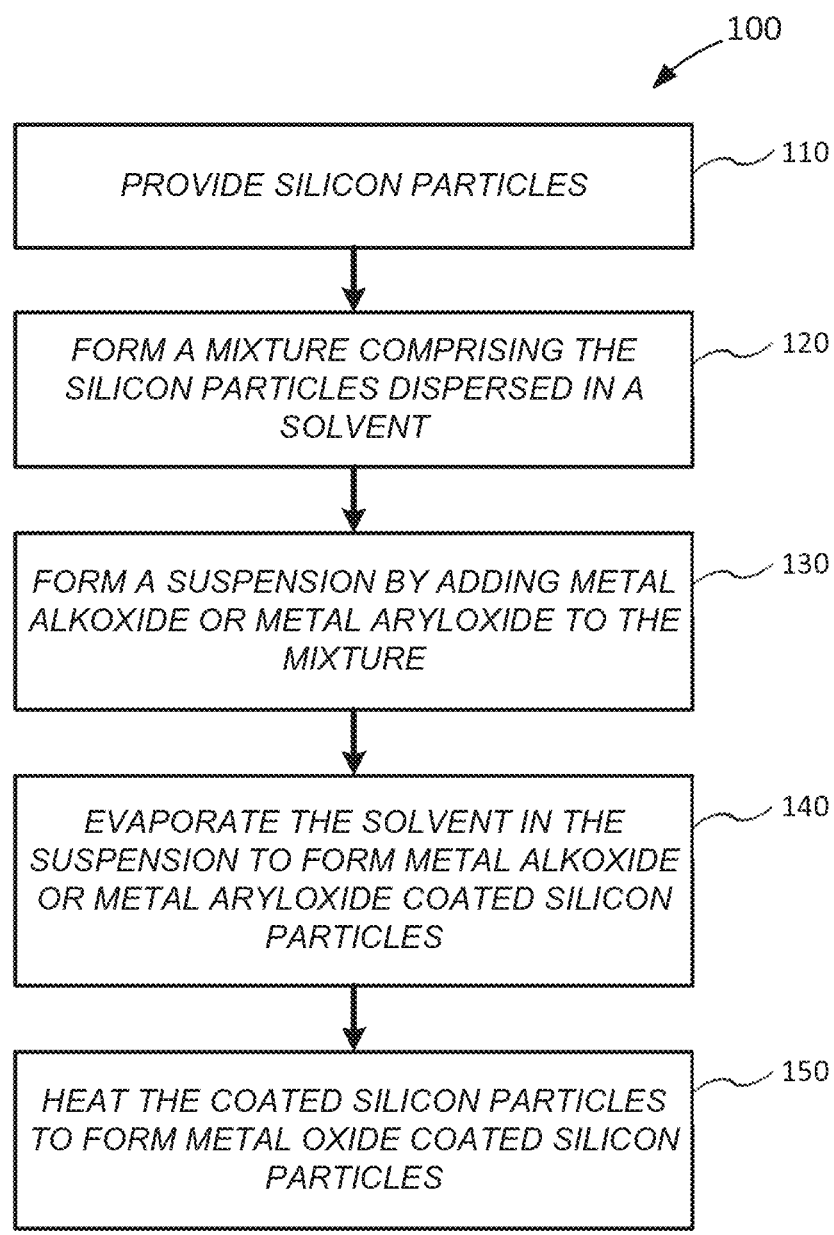
FIG. 1 is a flow diagram schematically illustrating an example method of preparing an electrode material in accordance with certain implementations described herein.

FIG. 1 is a flow diagram schematically illustrating an example method of preparing an electrode material in accordance with certain implementations described herein. The method 100 of preparing an electrode material can include providing silicon particles as shown in block 110 and forming a mixture comprising the silicon particles dispersed in a solvent as shown in block 120. The method 100 can also include forming a suspension by adding metal alkoxide or metal aryloxide to the mixture as shown in block 130 and evaporating the solvent in the suspension to form metal alkoxide or metal aryloxide coated silicon particles as shown in block 140. As shown in block 150, the method can also include heating the coated silicon particles to form metal oxide coated silicon particles.

Referring to block 110, silicon particles can be provided. The silicon particles may refer to particles, powders, fibers, etc. The silicon particles can be at least partially crystalline, substantially crystalline, and/or fully crystalline. The silicon particles may or may not be substantially pure silicon. For example, the silicon particles may be substantially silicon or may be a silicon alloy. In some instances, the silicon alloy includes silicon as the primary constituent along with one or more other elements.

In some implementations, the particle size (e.g., diameter or a largest dimension of the silicon particles) can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

Referring to block 120, the silicon particles can be dispersed in a solvent to form a mixture. The solvent can include a polar organic solvent. As an example, the solvent can include an alcohol, e.g., ethyl alcohol. Other example solvents include 2-Methoxyethanol (methyl cellosolve), tetrahydrofuran (THF), carbon disulfide, and/or other water-free organic solvents.

Referring to blocks 130, 140, and 150, a suspension can be formed by adding metal alkoxide or metal aryloxide to the mixture. The solvent in the suspension can be evaporated to form metal alkoxide or metal aryloxide coated silicon particles. Heating the coated silicon particles can form metal oxide coated silicon particles. In some instances, a transition metal oxide coating can be formed. In some instances, a non-transition metal oxide coating can be formed.

Metal alkoxides and metal aryloxides can be used as precursors for oxide synthesis because the hydrolysis and condensation of alkoxide or aryloxide ligand-supported metal complexes can form metal oxides via the so-called sol-gel process through three steps: 1) partial hydrolysis of metal alkoxides or aryloxide to form reactive monomers: 2) the polycondensation of these monomers to form colloid-like oligomers; 3) additional hydrolysis to promote polymerization and cross-linking leading to a 3-dimensional matrix. Although presented sequentially, these reactions may occur simultaneously after the initial processing stage in some implementations.

In the metal-organic route, metal-organic precursors (e.g., alkoxides or aryloxides) are dissolved in water-free organic solvents to form a homogeneous solution. An alkoxide and aryloxide are derivatives of alcohol and can comprise of a metal or a semi-metal (M), oxygen (O) attached to an alkyl or aryl group (R), M-OR. The starting chemicals for the synthesis and the solvents can be carefully dried as some alkoxides and aryloxides may be sensitive to moisture and/or oxygen. The first step in the metal-organic route is a hydrolysis step where the alkoxo or aryloxo group is changed for a hydroxo group while an alcohol molecule is expelled. In the next step, the hydroxyl complexes, M-OH, react with another alkoxide or aryloxide (or hydrolyzed alkoxide or aryloxide) molecule in one of two different ways, olation or oxolation. Both these reactions are condensation reactions because metal-oxygen bridges are formed while a small molecule is expelled. The condensation phase can proceed as long as sufficient water is available to form either a gel or a precipitate. A gel with specific desired structure and properties can be obtained by control of the hydrolysis and condensation steps.

Figure 2:
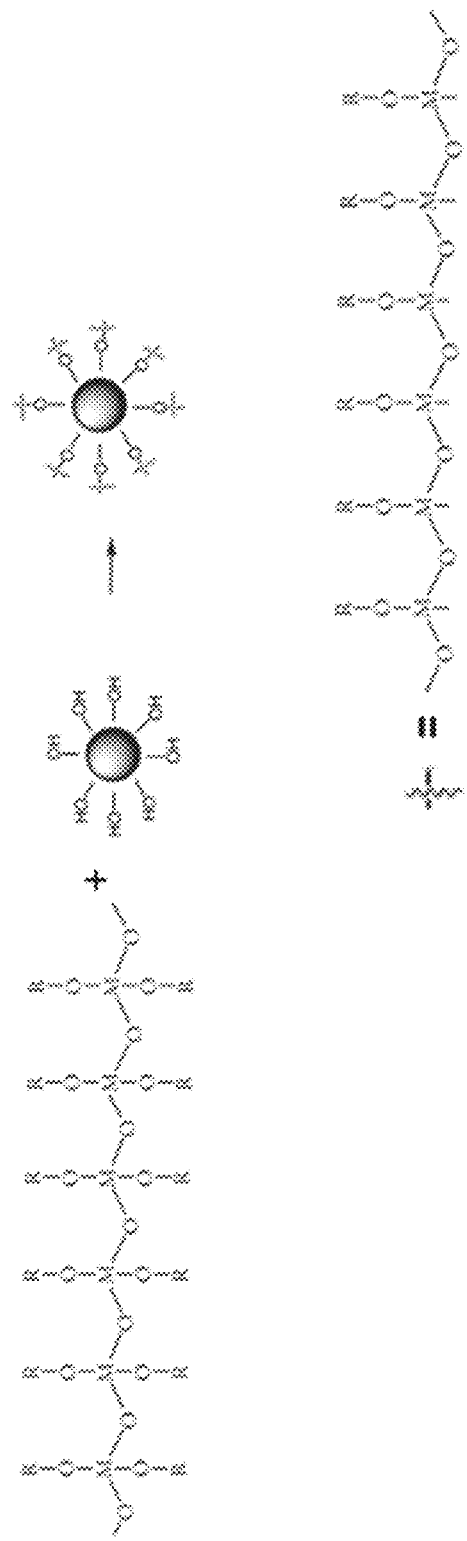
FIG. 2 schematically illustrates the formation of metal alkoxide or metal aryloxide coated silicon particles.

In addition, alkoxides and aryloxides can have a strong tendency for polymerization creating coordination polymers $[M(OR)_x]_y$ (where y represents the degree of polymerization). Metal alkoxides and aryloxides $[M(OR)_x]_y$ are well soluble in common organic solvents and creates small oligomers with y=2, 3, 4. The formation of oligomers or larger polymeric frameworks may be due to alkoxide and aryloxide groups bridging two or more metal centers and the tendency of metals to increase their coordination number. FIG. 2 schematically illustrates forming a suspension by adding metal alkoxide or aryloxide to the mixture comprising silicon particles and evaporating the suspension to form a polymeric metal alkoxide or aryloxide layer on silicon particles (e.g., metal alkoxide or aryloxide coated silicon particles).

Furthermore, alkoxide and aryloxide ligands can be easily removable via thermal treatments. These compounds can have established metal-oxygen bonds. Thermal deposition or decomposition processes can be carried out at relatively low temperatures compared to conventional methods involving other inorganic salts. These features can allow the metal oxides derived from metal alkoxides or aryloxides, to be highly pure with specific properties, such as high hardness, chemical and mechanical resistance, and high temperature stability. In the presence of a large amount of Si particles (e.g., powders), inorganic polymers can be constructed progressively on the surface of Si particles. The subsequent thermal treatments may result ultimately in metal oxide formation on the surface of Si particles. Heat treatments can include annealing and/or pyrolyzing. Heating can include heating at a temperature in a range of about 400° C. to about 1350° C.). The metal oxide can be formed by different mechanisms. As an example, hydrolysis of the metal alkoxide can form an alcohol and a metal hydroxide, followed by thermal degradation of the hydroxide to form metal oxides. In some instances, a metal oxycarbide may form. For example, metal oxide and carbon can form metal oxycarbide. The carbon may be present in elemental form or may be generated from thermal decomposition of organic species.

In various implementations, the coating can have good ionic conductivity and mechanical properties. In some instances, the coating can be electrochemically active and have good electrical conductivity. The metal oxide coating on the Si particles can be about 1 nm to about 75 nm thick (e.g., about 1 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, etc.) or any ranges within this range (e.g., about 10 nm to about 70 nm, about 10 nm to about 60 nm, about 10 nm to about 50 nm, about 10 nm to about 40 nm, about 10 nm to about 30 nm, about 15 nm to about 70 nm, about 15 nm to about 60 nm, about 15 nm to about 50 nm, about 15 nm to about 40 nm, about 15 nm to about 30 nm, etc.).

Various implementations can have one or more advantages: (i) The processes can be easy to carry out; (ii) the by-products are water or ethanol and can be easy to remove; (iii) no other impurities are introduced in the systems, and no extra complicated purification steps are needed; and (iv) the particle size distribution of Si particles does not change significantly after treatment and there may be no mass loss for the Si particles.

In some implementations, the metal alkoxide is represented by $M(OR)_x$, where M is a metal, each R can be methyl (Me), ethyl (Et), n-propyl ($Pr^n$), iso-propyl ($Pr^i$), n-butyl ($Bu^n$), sec-butyl ($Bu^s$), iso-butyl ($Bu^i$), or tert-butyl ($Bu^t$), and x can be 1, 2, 3, 4, or 5. The structures are shown below.

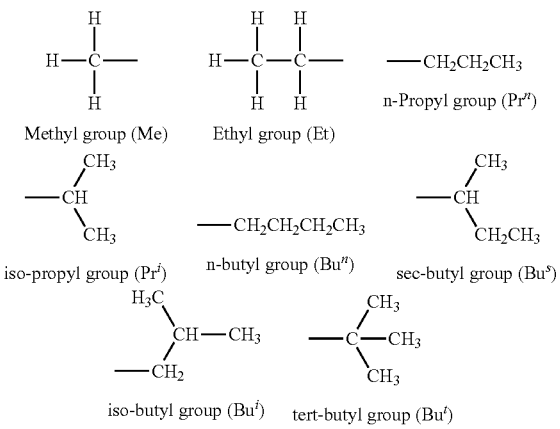

In some implementations, the metal aryloxide is represented by $M(OR)_x$, where M is a metal, each R can be phenyl ($C_6H_5$), naphthyl ($C_{10}H_8$), tolyl ($CH_3C_6H_4$), or xylyl [$(CH_3)_2 C_6H_3$], and x can be 1, 2, 3, 4, or 5.

M can be a Group 1 metal. For example, M can be Li, Na, K, Rb, Cs, etc.

M can be a bivalent metal, a trivalent metal, a quadrivalent metal, a quinquevalent metal, or a sexavalent metal.

The bivalent metal can be beryllium (Be) (II), magnesium (Mg) (II), calcium (Ca) (II), strontium (Sr) (II), barium (Ba) (II), iron (Fe) (II), cadmium (Cd) (II), cobalt (Co) (II), nickel (Ni) (II), manganese (Mn) (II), copper (Cu) (II), mercury (Hg) (II), or samarium (Sm) (II).

The trivalent metal can be chromium (Cr) (III), boron (B) (III), lanthanum (Ln) (III), iron (Fe) (III), gallium (Ga) (III), molybdenum (Mo) (III), tungsten (W) (III), yttrium (Y) (III), or indium (In) (III).

The quadrivalent metal can be silicon (Si) (IV), tin (Sn) (IV), cerium (Ce) (IV), zirconium (Zr) (IV), germanium (Ge) (IV), selenium (Se) (IV), thorium (Th) (IV), lead (Pb) (IV), or hafnium (Hf) (IV).

The quinquevalent metal can be phosphorus (P) (V), arsenic (As) (V), antimony (Sb) (V), vanadium (V) (V), tantalum (Ta) (V), or uranium (U) (V).

The sexavalent metal can be molybdenum (Mo) (VI) or tungsten (W) (VI).

In some examples, M can Ti, Al, or Nb. For example, the metal alkoxide can be $Ti(OR)_4$, $Al(OR)_3$, or $Nb(OR)_5$. Examples can include titanium (IV) isopropoxide, aluminum isopropoxide, and niobium (V) ethoxide.

Some implementations can use bi-metallic alkoxides or bi-metallic aryloxides to coat a layer of mixed metal oxide on the silicon particles. The metals can be any two of those mentioned herein. As an example, the metal alkoxide can be $LiNb(OEt)_6$ where Et is ethyl, and the metal oxide can be $LiNbO_3$. As another example, the metal alkoxide can be $ZnSn(OEt)_6$ where Et is ethyl, and the metal oxide can be $ZnSnO_3$.

Some implementations can use ter-metallic alkoxides or ter-metallic aryloxides to coat a layer of mixed metal oxide on the silicon particles. The metals can be any three of those mentioned herein.

Some implementations can use tetra-metallic alkoxides or tetra-metallic aryloxides to coat a layer of mixed metal oxide on the silicon particles. The metals can be any four of those mentioned herein.

The coated silicon particles (e.g., silicon particles coated with metal oxide and/or silicon particles coated with metal alkoxide or metal aryloxide) can be used to form an electrode, e.g., any electrode known in the art or yet to be developed. In some implementations, the electrode material can be formed into a film-based electrode. For example, the electrode material can be formed into silicon-carbon composite films fabricated through using the silicon material and carbonized polymer. For instance, the method can include forming an electrode active material precursor comprising the metal oxide coated silicon particles (or metal alkoxide or metal aryloxide coated silicon particles) dispersed in a carbon precursor. The method can also include coating the electrode active material precursor onto a substrate to form a green active material film, drying the green active material film, and heating the green active material film to form a silicon-carbon composite electrode material film. In some implementations, the electrode material can be formed into electrodes comprising the particles coated on a current collector with a binder.

Some example electrodes will now be described.

Film-Based Electrodes and Methods of Forming the Same

In order to further improve the cycle performance of Si electrode-based Li-ion batteries, an integrated structure can be designed and constructed by combining two or more coating materials on the basis of the synergistic effects of each coating layer. These conformal coating layers not only can reduce the possibility and/or prevent the Si phase from directly being exposed to the electrolyte (leading to the formation of a thin SEI film), but also can provide high electronic conductivity and stronger mechanical stability. For example, metallic oxide layers can act as an artificial defensive matrix with robust mechanical strength and chemical nature, thus acting as a stable artificial SEI film and protecting the surface of Si. The further coating of a carbon layer may further allow passage of Li-ions to react with the Si anode, and provide a certain buffer behavior for Si volume changes due to being both electrically and ionically conducting as well as being mechanically and chemically stable.

In various implementations, the electrodes (e.g., anodes and cathodes) may include carbonized polymer and silicon material (e.g., silicon particles coated with metal oxide and/or silicon particles coated with metal alkoxide or metal aryloxide). For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium-ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

U.S. patent application Ser. No. 13/008,800, U.S. patent application Ser. No. 13/601,976, and U.S. patent application Ser. No. 13/799,405, each of which are incorporated by reference herein, describe certain implementations of carbon-silicon composite materials using carbonized polymer and silicon material. The carbonized polymer can act as an expansion buffer for silicon particles during cycling so that a high cycle life can be achieved. In certain implementations, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some implementations. Accordingly, in U.S. patent application Ser. No. 13/008,800, application Ser. No. 13/601,976, and U.S. patent application Ser. No. 13/799,405, certain implementations of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain implementations, the carbon precursor is a hydrocarbon compound. For example, the precursor can include polyamideimide (PAI), polyamic acid, polyimide (PI), etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain implementations, the amount of precursor (e.g., solid polymer) in the solvent is about 10 wt. % to about 30 wt. %.

The mixture can include silicon particles as described herein. The mixture may comprise greater than about 0% to about 99% by weight of the precursor, and greater than 0% to about 99% by weight of the silicon particles. Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain implementations, the mixture is cast on a substrate. In some implementations, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some implementations, the substrate comprises polyethylene terephthalate (PET), including for example Mylar®. In certain implementations, the dried mixture is a film or sheet. In some implementations, the dried mixture is optionally cured. In some implementations, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, deionized (DI) water can be used to rinse the dried mixture. In certain implementations, tape casting techniques can be used for the casting. In some implementations, the mixture can be coated on a substrate by a slot die coating process (e.g., metering a constant or substantially constant weight and/or volume through a set or substantially set gap). In some other implementations, there is no substrate for casting and the anode film does not need to be removed from any substrate. The dried mixture may be cut or mechanically sectioned into smaller pieces.

The mixture further goes through pyrolysis to convert the polymer precursor to carbon. In certain implementations, the mixture is pyrolyzed in a reducing atmosphere. For example, an inert atmosphere, a vacuum and/or flowing argon, nitrogen, or helium gas can be used. In some implementations, the mixture is heated to about 900° C. to about 1350° C. For example, polyimide formed from polyamic acid can be carbonized at about 1175° C. for about one hour. In certain implementations, the heat up rate and/or cool down rate of the mixture is about 10° C./min. A holder may be used to keep the mixture in a particular geometry. The holder can be graphite, metal, etc. In certain implementations, the mixture is held flat. After the mixture is pyrolyzed, tabs can be attached to the pyrolyzed material to form electrical contacts. For example, nickel, copper or alloys thereof can be used for the tabs.

In certain implementations, one or more of the methods described herein can be carried out in a continuous process. In certain implementations, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor forms a pyrolytic carbon and results in one or more type of carbon phases. The term "pyrolytic carbon" refers to carbon formed by pyrolysis. Pyrolytic carbon may comprise hard and/or soft carbon, but does not include graphite. In some implementations, the precursor is any material that can be pyrolyzed to form a pyrolytic carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from greater than about 0% to about 99% by weight of the composite material.

For example, the electrochemically active material can include from greater than 0% to about 99% by weight of silicon. For example, the amount of silicon by weight of the electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, from about 80% to about 90% by weight, from about 80% to about 95% by weight, from about 80% to about 99% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 60% to about 95% by weight of silicon, at least about 60% to about 99% by weight of silicon, at least about 70% to about 95% by weight of silicon, at least about 70% to about 99% by weight of silicon, at least about 80% to about 95% by weight of silicon, at least about 80% to about 99% by weight of silicon, etc. In some examples, the electrochemically active material can include 99% by weight of silicon.

As described herein, In some implementations, all, substantially all, or at least some of the silicon particles may have a particle size (e.g., the diameter or the largest dimension of the particle) between about 10 nm and about 50 μm. In some implementations, the average particle size (or the average diameter or the average largest dimension) or the median particle size (or the median diameter or the median largest dimension) of the silicon particles can be between about 10 nm and about 50 μm. In some implementations, the silicon particles may have a distribution of particle sizes. For example, at least about 95%, at least about 90%, at least about 85%, at least about 80%, at least about 70%, or at least about 60% of the particles may have the particle size described herein.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 80% by weight such as about 1% to about 80% by weight, about 1% to about 70% by weight, about 1% to about 60% by weight, about 1% to about 50% by weight, about 1% to about 40% by weight, about 1% to about 30% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor. The carbon is obtained through heating a carbon-containing precursor at a temperature sufficient for pyrolysis of the precursor to occur, and is thus pyrolytic carbon.

The carbon from the precursor can be hard and/or soft carbon. Hard carbon can be a carbon that does not convert into graphite even with heating in excess of 2800 degrees Celsius. Precursors that melt or flow during pyrolysis convert into soft carbons with sufficient temperature and/or pressure. In some instances, upon further heat treatment, (e.g., between 2000° C.-3000° C.) precursors may form graphite. Hard carbon may be selected in some implementations since soft carbon precursors may flow and soft carbons and graphite are mechanically weaker than hard carbons. Possible pyrolytic carbon precursors can include polyimide (or a polyimide precursor), other aromatic polyimides, phenolic resins, epoxy resins, poly(p-phenylene vinylene) (PPV), poly(p-phenylene-1,3,4-oxadiazole) (POD), benzimidazobenzophenanthroline ladder (BBL) polymer, and other polymers that have a very high melting point or are crosslinked. The amount of pyrolytic carbon (e.g., hard carbon and/or soft carbon, but not graphite) in the composite material can be any of the ranges described herein with respect to the amount of carbon obtained from the precursor. In certain implementations, the pyrolytic carbon phase is substantially amorphous. In other implementations, the pyrolytic carbon phase is substantially crystalline. In further implementations, the pyrolytic carbon phase includes amorphous and crystalline carbon. The pyrolytic carbon phase can be a matrix phase in the composite material. The pyrolytic carbon can also be embedded in the pores of the additives including silicon. The pyrolytic carbon may react with some of the additives to create some materials at interfaces. For example, there may be a layer of silicon carbide and/or silicon carbide containing oxygen (Si—C—O) between silicon particles and the pyrolytic carbon. In some instances, a metal oxycarbide may form between the silicon particles and the pyrolytic carbon.

In some implementations, upon further heat treatment, graphite is one of the types of carbon phases from the precursor. In certain implementations, graphite particles are added to the mixture. Graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer (in certain directions) than pyrolytic carbon and can better absorb the volume expansion of silicon additives. In certain implementations, all, substantially all, or at least some of the graphite particles may have a particle size (e.g., a diameter or a largest dimension) between about 0.5 microns and about 20 microns. In some implementations, an average particle size (e.g., an average diameter or an average largest dimension) or median particle size (e.g., a median diameter or a median largest dimension) of the graphite particles is between about 0.5 microns and about 20 microns. In some implementations, the graphite particles may have a distribution of particle sizes. For example, at least about 95%, at least about 90%, at least about 85%, at least about 80%, at least about 70%, or at least about 60% of the particles may have the particle size described herein. In certain implementations, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain implementations, conductive particles which may also be electrochemically active are added to the mixture. Such particles can enable both a more electronically conductive composite as well as a more mechanically deformable composite capable of absorbing the large volumetric change incurred during lithiation and de-lithiation. In certain implementations, all, substantially all, or at least some of the conductive particles can have a particle size (e.g., the diameter or the largest dimension) between about 10 nanometers and about 7 micrometers. In some implementations, an average particle size (e.g., an average diameter or an average largest dimension) or a median particle size (e.g., a median diameter or a median largest dimension) of the conductive particles is between about 10 nm and about 7 micrometers. In some implementations, the conductive particles may have a distribution of particle sizes. For example, at least about 95%, at least about 90%, at least about 85%, at least about 80%, at least about 70%, or at least about 60% of the particles may have the particle size described herein.

In certain implementations, the mixture includes conductive particles in an amount greater than zero and up to about 80% by weight. In some implementations, the composite material includes about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

After the precursor is pyrolyzed, the resulting carbon material can be a self-supporting monolithic structure. The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain implementations, material particles added to the mixture are homogenously or substantially homogeneously distributed throughout the composite material to form a homogeneous or substantially homogeneous composite.

In some implementations, the composite material and/or electrode does not include a polymer beyond trace amounts that remain after pyrolysis of the precursor. In further implementations, the composite material and/or electrode does not include a non-electrically conductive binder. The composite material may also include porosity. In some implementations, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. In some instances, the current collector can include copper, nickel, stainless steel, aluminum, etc. U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," and U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," each of which is incorporated by reference herein, describe certain implementations of electrodes including a current collector, electrochemical cells comprising such electrodes, and methods of forming such electrodes and electrochemical cells.

Slurry-Based Electrodes and Methods of Forming the Same

In some implementations, the electrode can include the modified silicon particles (e.g., metal oxide coated silicon particles) coated on a current collector (e.g., a Cu foil, Ni foil, Al foil, etc.). For example, the modified silicon particles can be coated on a current collector with a binder. For instance, the particles can be added to a slurry and coated on a current collector. Additional conductive particles (e.g., super P, graphene, graphite, carbon nanofibers, carbon nanotubes, or other carbon) can also be added to the slurry. The slurry can contain a solvent and/or binder. In some instances, a binder is applied separately. In some implementations, the particles can be coated on a current collector without solvents. For example, the particles in a dry slurry can be coated on a current collector in a dry process In some implementations, the particles can be applied on a current collector coated with binder. In some instances, a binder can be applied separately.

The electrochemically active material can include from greater than 0% to about 100% by weight of silicon. For example, the electrochemically active material can include from greater than 0% to about 100% by weight of silicon. For example, the amount of silicon by weight of the electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, greater than about 0% to about 99% by weight, from about 10% to about 35% by weight, from about 10% to about 50% by weight, from about 10% to about 90% by weight, from about 10% to about 95% by weight, from about 10% to about 99% by weight, from about 10% to about 100% by weight, from about 30% to about 85% by weight, from about 30% to about 90% by weight, from about 30% to about 95% by weight, from about 30% to about 99% by weight, from about 30% to about 100% by weight, from about 50% to about 85% by weight, from about 50% to about 90% by weight, from about 50% to about 95% by weight, from about 50% to about 99% by weight, from about 50% to about 100% by weight, from about 60% to about 85% by weight, from about 60% to about 90% by weight, from about 60% to about 95% by weight, from about 60% to about 99% by weight, from about 60% to about 100% by weight, from about 70% to about 85% by weight, from about 70% to about 90% by weight, from about 70% to about 95% by weight, from about 70% to about 99% by weight, from about 70% to about 100% by weight, from about 80% to about 90% by weight, from about 80% to about 95% by weight, from about 80% to about 99% by weight, from about 80% to about 100% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 50% to about 100% by weight of silicon, at least about 60% to about 95% by weight of silicon, at least about 60% to about 99% by weight of silicon, at least about 60% to about 100% by weight of silicon, at least about 70% to about 95% by weight of silicon, at least about 70% to about 99% by weight of silicon, at least about 70% to about 100% by weight of silicon, at least about 80% to about 95% by weight of silicon, at least about 80% to about 99% by weight of silicon, at least about 80% to about 100% by weight of silicon. In some examples, the electrochemically active material can include 100% silicon.

Additionally or alternatively, metal alkoxide or metal aryloxide coated silicon particles can be coated on a current collector, and subsequently heat treated to form metal oxide coated silicon particles on a current collector.

Figure 3:
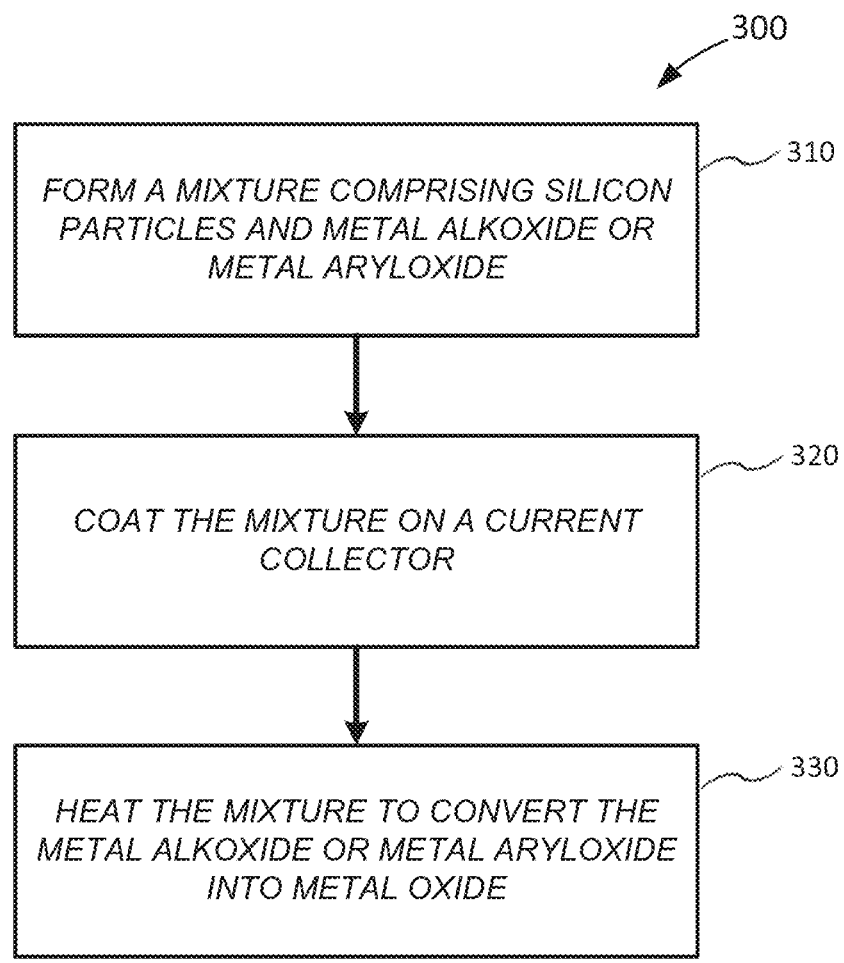
FIG. 3 is a flow diagram schematically illustrating an example method of preparing an electrode in accordance with certain implementations described herein.

Additionally or alternatively, a mixture of silicon particles (e.g., coated or uncoated) and metal alkoxide or metal aryloxide can be coated on a current collector. FIG. 3 is a flow diagram schematically illustrating an example method of preparing an electrode in accordance with certain implementations described herein. The method 300 of preparing an electrode can include forming a mixture comprising silicon particles and metal alkoxide or metal aryloxide as shown in block 310 and coating the mixture on a current collector as shown in block 320. The method 300 can also include heating the mixture to convert the metal alkoxide or metal aryloxide into metal oxide (e.g., as a coating layer on the surface of the Si particles and/or as a structural component separate from the Si particles).

Referring to block 310, the mixture can be formed by combining metal alkoxide or metal aryloxide with silicon particles. For example, metal alkoxide or metal aryloxide can be added to a mixture containing silicon material. The metal alkoxide or metal aryloxide can be any of those described herein. In some instances, the mixture can include carbon (e.g., carbon black such as Super P) and/or binder. In some instances, the mixture is a slurry and can contain a solvent. In some implementations, the mixture is a dry mixture containing particles of silicon and particles of metal alkoxide or metal aryloxide. The mixture may also contain additional conductive particles (e.g., metal and/or graphite).

Referring to block 320, the mixture (dry or with solvent) can be coated on a current collector. For example, the mixture may contain a binder or a binder may be applied separately. In some instances, the mixture can be coated on a current collector without solvents. For example, the particles in a dry mixture can be coated on a current collector in a dry process. In some implementations, the particles can be applied on a current collector coated with binder. In some instances, the binder can be applied separately.

Referring to block 330, the metal alkoxide or metal aryloxide can be converted into metal oxide with heat treatment. For example, heating the mixture can comprise annealing and/or pyrolyzing the mixture. In some instances, heating can occur at a temperature in a range of about 400° C. to about 1350° C.). In some instances, heating can occur in an inert (e.g., argon) atmosphere. The metal oxide can form as a coating on the surface of the Si particles and/or as a structural component separate from the Si particles.

Dip-Coated Electrodes and Methods of Forming the Same

Figure 4:
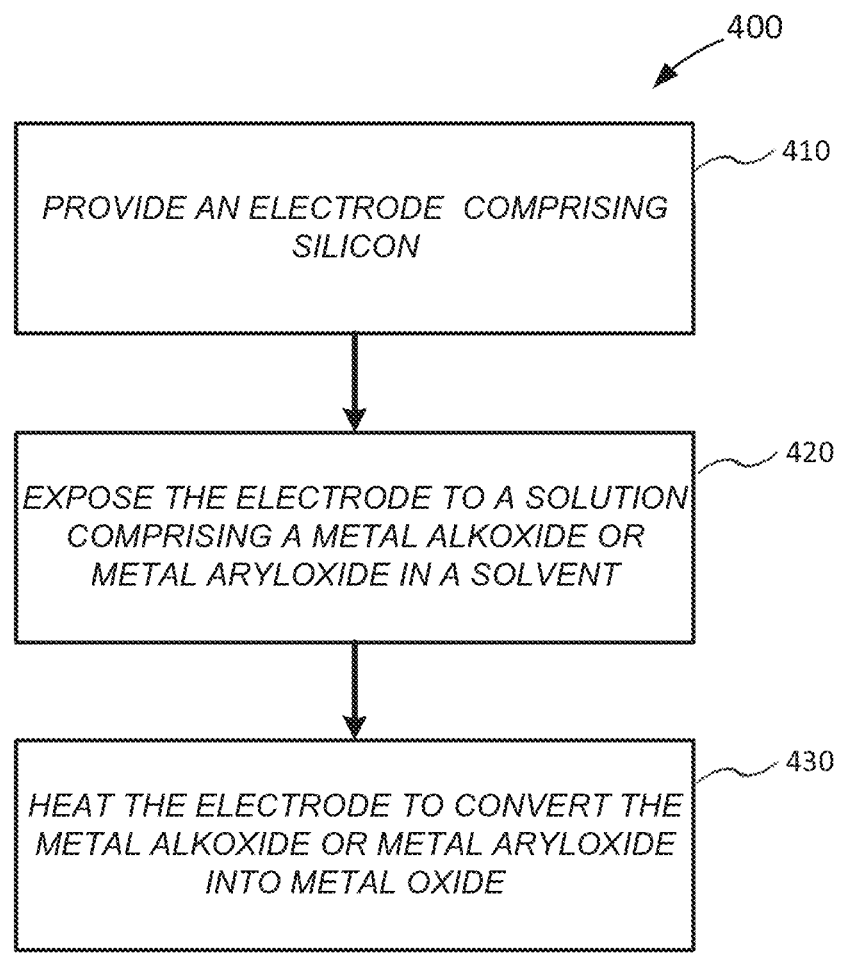
FIG. 4 is a flow diagram schematically illustrating an example method of preparing an electrode in accordance with certain implementations described herein.

Additionally or alternatively, electrodes can be exposed to a solution containing metal alkoxide or metal aryloxide. FIG. 4 is a flow diagram schematically illustrating an example method of preparing an electrode in accordance with certain implementations described herein. The method 400 of preparing an electrode can include providing an electrode comprising silicon as shown in block 410 and exposing the electrode to a solution comprising a metal alkoxide or metal aryloxide in a solvent as shown in block 420. The method 400 can also include heating the electrode to convert the metal alkoxide or metal aryloxide into metal oxide.

Referring to block 410, the provided electrode can be any electrode known in the art or yet to be developed. For example, the electrode can be any electrode described herein. In some instances, the electrode is a silicon-containing electrode. For example, the electrode can be a silicon-carbon composite film. As another example, the electrode can comprise silicon particles coated on a current collector. In some instances, the electrode is a silicon-dominant electrode (e.g., comprising silicon-dominant electrochemically active material).

Referring to block 420, the electrode can be exposed to a solution comprising a metal alkoxide or metal aryloxide. For example, the electrode can be dip-coated in a solution comprising a metal alkoxide or metal aryloxide. The metal alkoxide or metal aryloxide can be any of those described herein. The solution can be any of those described herein related to placing silicon particles in a solution comprising metal alkoxide or metal aryloxide. For example, the solvent can include a polar organic solvent. As an example, the solvent can include an alcohol, e.g., ethyl alcohol. Other example solvents include 2-Methoxyethanol (methyl cellosolve), tetrahydrofuran (THF), and/or carbon disulfide. In various implementations, the solution can penetrate the electrode and the metal alkoxide or metal aryloxide can be absorbed or attached to the surface and/or inside the electrode.

Referring to block 430, the metal alkoxide or metal aryloxide can be converted into metal oxide with heat treatment. For example, heating the electrode can comprise annealing and/or pyrolyzing the electrode. In some instances, heating can occur at a temperature in a range of about 400° C. to about 1350° C.). In some instances, heating can occur in an inert (e.g., argon) atmosphere.

In some instances, after heat treatment, the electrode can be coated with a layer of metal oxide and/or can comprise metal oxide within the electrode. For example, metal oxide particles can form in the solution, and the suspension containing metal oxides can be used as a dipping solution for the electrode. The metal oxide particles can be coated on the electrode. In some instances, a metal oxycarbide can form on the electrode. The process can be carried out in roll form in a continuous dip coating process. Other methods of coating the electrode can also be used, such as spray coating, gravure, slot die, reverse comma, and/or doctor blade. In some instances, moisture can be added to the solution to transfer metal alkoxide or metal aryloxide into metal oxide on the surface of the electrode. The electrode surface can act as a precipitating layer and a metal oxide layer can be coated on the electrode. In some instances, layer may include a metal oxycarbide. The process can be carried out in a continuous roll-to-roll process. Other methods can also be used.

Electrochemical Cells

In some implementations, the electrodes described herein can be used in any electrochemical device known in the art or yet to be developed. For example, the electrochemical device can be a battery, e.g., a lithium ion battery. In some implementations, the battery is a secondary battery, or in other implementations, the battery is a primary battery. The electrochemical device can include a first electrode, a second electrode, and an electrolyte. The first electrode can be any electrode described herein.

In some implementations, the electrode can be a film-based electrode described herein. The electrochemically active material can include from greater than 0% to about 99% by weight of silicon. In some such instances, the electrode can include a silicon-dominant electrode. As an example, the electrochemically active material can include at least about 50% to about 99% by weight of silicon. In some implementations, the electrode can include silicon particles coated on a current collector (e.g., with a binder). The electrochemically active material can include from greater than 0% to about 100% by weight of silicon. In some such instances, the electrode can include a silicon-dominant electrode. As an example, the electrochemically active material can include at least about 50% to about 100% by weight of silicon. The current collector can be any known in the art or yet to be developed. In some instances, the current collector can comprise copper, nickel, stainless steel, aluminum, etc.

The first electrode can comprise an anode. The second electrode can comprise a cathode. For example, the cathode can comprise Lithium-Cobalt-Oxide ($LiCoO_2$) (LCO). As another example, the cathode can comprise Lithium-Manganese-Oxide ($LiMnO_2$) (LMO). As other examples, the cathode can be a layered Lithium Nickel-Cobalt-Manganese oxide (NCM) or Lithium Nickel-Cobalt-Aluminum oxide (NCA) cathode. In some embodiments, the cathode can include a lithium rich oxide, a nickel-rich oxide, a high-voltage cathode material, a lithium rich layered oxide, a nickel-rich layered oxide, a high-voltage spinel oxide, and/or a high-voltage polyanionic compound. Lithium rich oxides may include $xLi_2MnO_3 \cdot (1-x)LiNi_aCo_bMn_cO_2$, where $0<x<1$, $a+b+c=1$. Nickel rich oxides may include $LiNi_xCo_yMn_zO_2$, where $0 \leq x, y, z<1$ and $x+y+1=1$, (NCM) or $Li[Ni_xCo_yAl_{1-x-y}]O_2$, where $0 \leq x, y, z<1$ and $x+y+1=1$, (NCA). Nickel-rich layered oxides may include $LiNi_{1-x}M_xO_2$, where M comprises Co, Mn, or Al). Lithium rich layered oxides may include $LiNi_{1+x}M_{1-x}O_2$, where M comprises Co, Mn, or Ni). High-voltage spinel oxides may include $LiNi_{0.5}Mn_{1.5}O_4$. High-voltage polyanionic compounds may include phosphates, sulfates, silicates, etc. In some instances, high-voltage may refer to at least 4.7V, 5V, etc. In some instances, the cathode can comprise carbon black (e.g., Super P). In some implementations, the cathode can comprise a binder (e.g., PVDF, CMC, SBR, Sodium Alginate, PAI, PAA, Li-PAA, PI, and mixtures and combinations thereof). In some embodiments, the cathode can comprise a current collector (e.g., Al foil). As an example, the cathode active material can be mixed with carbon black and binder to prepare a slurry. The slurry can be coated on the surface of the current collector. The solvent can be dried from the coated current collector to form a cathode. In some embodiments, the cathode can be a film-based electrode. Other examples are possible.

In some embodiments, the electrochemical device can comprise any electrolyte known in the art or yet to be developed. The electrolytes may be composed of cyclic carbonates, linear carbonates, and/or Li salts with or without additives. The cyclic carbonates can be fluoroethylene carbonate (FEC), di-fluoroethylene carbonate (DiFEC), Trifluoropropylene carbonate (TFPC), ethylene carbonate (EC), ethyl methyl carbonate (EMC), methyl acetate, and/or propylene carbonate (PC). The linear carbonates can be dimethyl carbonate (DMC), diethyl carbonate (DEC), gamma butyrolactone, Dimethoxyethane (DME), Dioxolane (DOL), 1,1,2,2-Tetrafluoroethyl 2,2,3,3-Tetrafluoropropyl Ether, other carbonate solvents (linear, cyclic or acyclic ones), ether solvents, etc. The Li salt can be hexafluorophosphate ($LiPF_6$), lithium tetrafluoroborate ($LiBF_4$), lithium hexafluoroarsenate monohydrate ($LiAsF_6$), lithium bis(trifluoromethanesulfonyl)imide (LiTFSI), lithium bis(fluorosulfonyl)imide (LiFSI), lithium difluoro(oxalate)borate (LiDFOB), lithium bis(oxalato)borate (LiBOB), lithium triflate ($LiCF_3SO_3$), lithium tetrafluorooxalato phosphate (LTFOP), lithium pentafluoroethyltrifluoroborate (LiFAB), lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), lithium tetrafluorooxalatophosphate (LiFOP), lithium perchlorate ($LiClO_4$), lithium difluorophosphate ($LiPO_2F_2$), or a combination thereof.

EXAMPLES

The surface properties of Si can affect the solid electrolyte interphase (SEI) structure and composition within lithium-ion cells after formation of the electrode. The Si volume expansion, electrode stability, and electrochemical cycling in Si electrode-based Li-ion batteries can be affected by the Si and the Si surface. A multifunctional thin coating on the surface of Si powders can help provide stronger physical support, preserve the mechanical structure, and reduce and/or suppress volume expansion of the Si. The coatings can also help protect electronic conduction pathways, reduce and/or inhibit side reactions between the electrolyte and the active Si phase, and control the growth of the SEI layer during charging and discharging cycles. The coating layer can reduce and/or minimize volume changes in the Si regions as well as the electrodes and cells, and assist in the formation of a stable SEI layer. In essence, the coating can help improve electrochemical performance and safety of Si electrode-based Li-ion batteries.

The below example processes for electrode fabrication generally include mixing components together, casting those components onto a removable substrate, drying, curing, removing the substrate, then pyrolyzing the resulting samples. N-Methyl-2-pyrrolidone (NMP) was used as a solvent to modify the viscosity of the mixture and render it castable using a doctor blade approach.

Examples were performed by coating $TiO_2$, $Al_2O_3$, or $Nb_2O_5$ thin layers on the surface of Si powders through chemical reactions in an alcohol solution and with a pyrolysis process at 400° C. in an Ar environment. The layers can act as a protective layer and can improve the lithium ion battery performance. In general: (i) metal alkoxides were used to prepare a continuous metal oxide layer and coating on the surface of micro-sized (D50 of approximately 1-20 μm) Si powders; (ii) $TiO_2$, $Al_2O_3$, or $Nb_2O_5$ thin layer coated Si powders were used to prepare Si-dominant composite film-based electrodes; (iii) the by-products were water or ethanol and were easily removed; (iv) no other impurities were introduced in the systems and no extra complicated purification steps were needed; and (v) the particle size distribution of Si powders had no significant change after treatment and there were also no mass loss for the Si powder.

Synthesis of $TiO_2$, $Al_2O_3$, and $Nb_2O_5$ Coated Si Powders

Silicon powders (D50 of approximately 1-20 μm) were dispersed in ethyl alcohol using a dispersion blade at over 200 rpm in a fume hood under air flow. The silicon to ethanol weight ratio was kept low (e.g., about 1/5 to 1/10). The metal alkoxide precursor, e.g., titanium (IV) isopropoxide, aluminum isopropoxide, and niobium (V) ethoxide, was added drop by drop in the silicon/ethanol suspension under dispersion. The metal alkoxide precursor to silicon weight ratio was kept between 6 to 10% depending on the type of the metal alkoxide precursor. The precursor weight % was calculated to finally obtain a coating comprising metal oxide or metal oxycarbide of about 15-50 nm on the silicon powder, based on the average silicon particle size and the density of the resulting oxide. Once all the precursor was added, the suspension was stirred until most of the solvent evaporated. Thereafter, the modified powder was dried in an air convection oven at 60° C. overnight to accelerate and complete hydrolysis of the metal alkoxides. Finally the modified powder was heat-treated at 400° C. for 1 hour under Argon flow of 5 SCFH and then allowed to cool passively under the same inert environment.

Fabrication of Electrodes

The treated silicon was dispersed in polyamic acid resin (15% solids in NMP) and graphite at 200 rpm and diluted with NMP to get to a slurry viscosity within 1500-3000 cP (total solid content of about 30%). The slurry was coated onto a PET film at a loading of 3.63 mg/cm$^2$ (with 15% solvent content), and densified using a calender. The green film was removed from the PET, cut into sheets, and vacuum dried using a two-stage process (120° C. for 15 h, 220° C. for 5 h). The dry film was thermally treated at 1175° C. to convert the polymer matrix into carbon. Separately, a 15 μm thick copper foil was coated with polyamide-imide with a nominal loading of 0.45 mg/cm$^2$ (applied as a 6 wt % varnish in NMP, dried 16 h at 110° C. under vacuum). The silicon-carbon composite film was laminated to the coated copper using a heated hydraulic press (50 seconds, 300° C., 4000 psi), forming the finished metal oxide coated silicon-composite electrode.

Fabrication of Cells

The Si-dominant anodes (using unmodified Si, TiO$_2$ coated Si, Al$_2$O$_3$ coated Si, or Nb$_2$O$_5$ coated Si) contained about 85 wt % Si, 1 wt % graphite and 14 wt % glassy carbon (from resin) and were laminated on 15 μm Cu foil. The average loading was about 3.8 mg/cm$^2$. The cathodes contained about 92 wt % NCA, 4 wt % conductive carbon and 4 wt % PVDF and were coated on 15 μm Al foil. The average loading was about 23 mg/cm$^2$. The electrolyte solution used was 1.2M LiPF$_6$ in FEC/EMC (3/7 wt %). Three cells were prepared for each test group with the average values used in FIGS. 5-13.

Figure 5A:
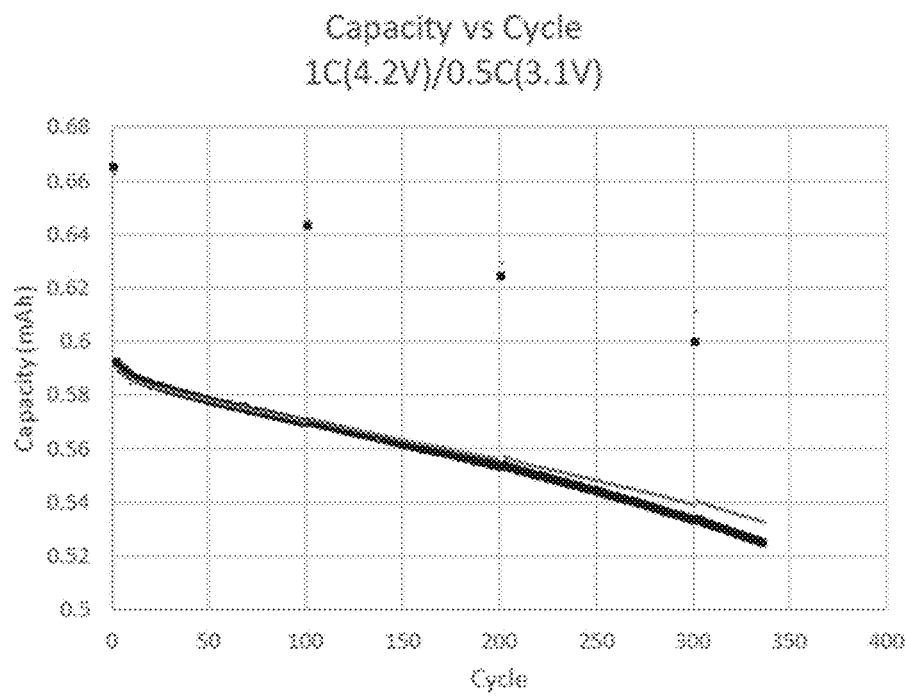
FIGS. 5A and 5B show Capacity Retention and Normalized Capacity Retention, respectively, for full cells with control anodes (darker line) and for full cells with anodes comprising $TiO_2$ coated Si (lighter line).
Figure 5B:
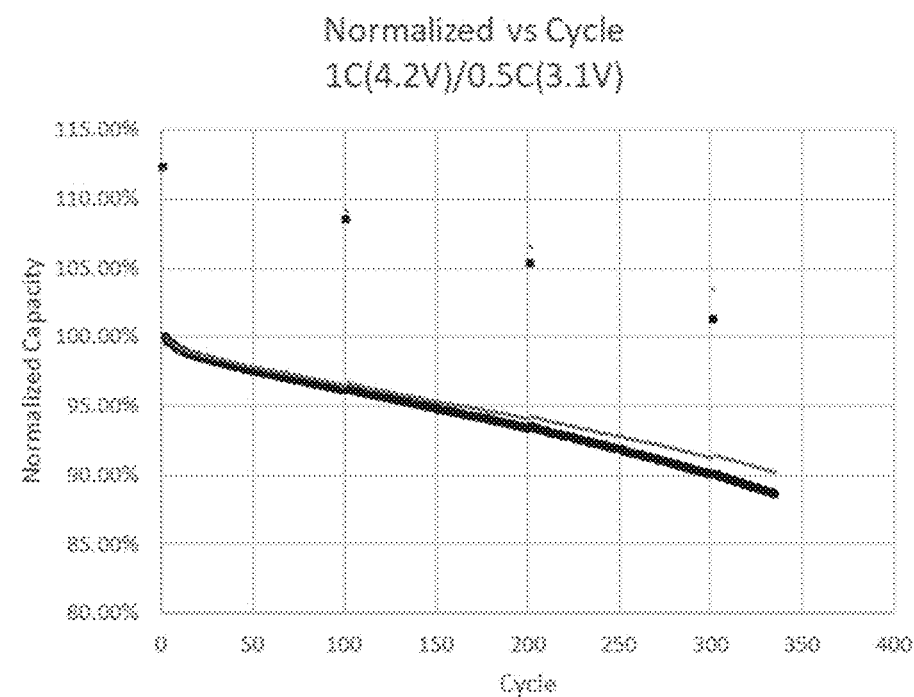

FIGS. 5A and 5B show Capacity Retention and Normalized Capacity Retention, respectively, for full cells with control anodes (darker line) and for full cells with anodes comprising TiO$_2$ coated Si (lighter line). The cycling regime for the cells included: (i) During the 1$^{st}$ cycle, charge at 0.33 C to 4.2 V until 0.05 C, rest 5 minutes, discharge at 0.33 C to 3 V, rest 5 minutes; and (ii) from the 2$^{nd}$ cycle, charge at 1 C to 4.2 V until 0.05 C, rest 5 minutes, discharge at 0.5 C to 3.1 V, rest 5 minutes. After every 99 cycles, the test conditions were repeated with the 1$^{st}$ cycle. The results show that cells with anodes comprising TiO$_2$ coated Si had better capacity retention than the cells with anodes comprising unmodified Si. The better capacity retention was also observed in the lower rate deep discharge cycles that were performed every 100 cycles.

Figure 6A:
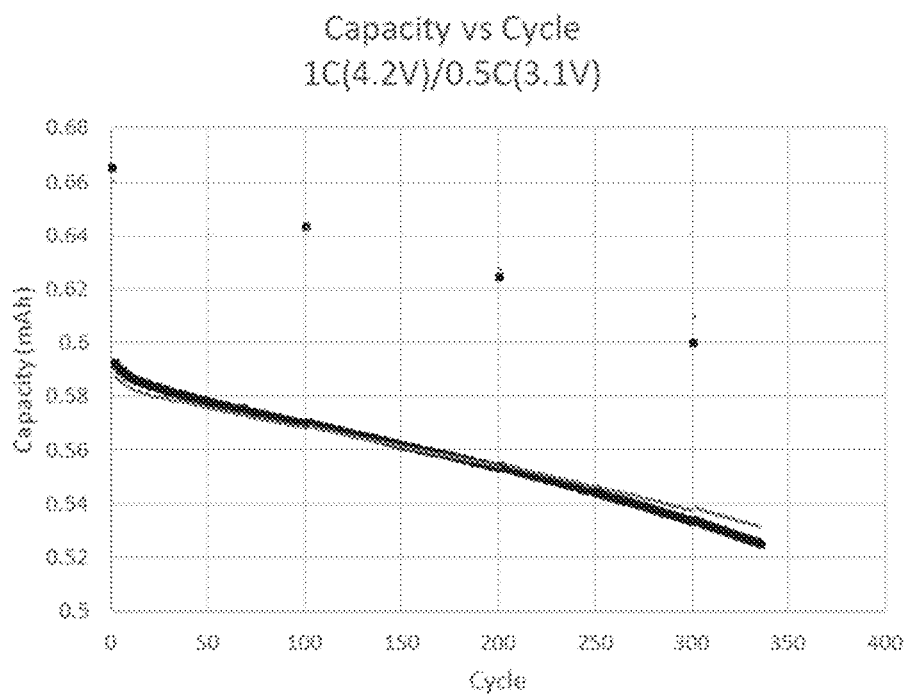
FIGS. 6A and 6B show Capacity Retention and Normalized Capacity Retention, respectively, for full cells with control anodes (darker line) and for full cells with anodes comprising $Al_2O_3$ coated Si (lighter line).
Figure 6B:
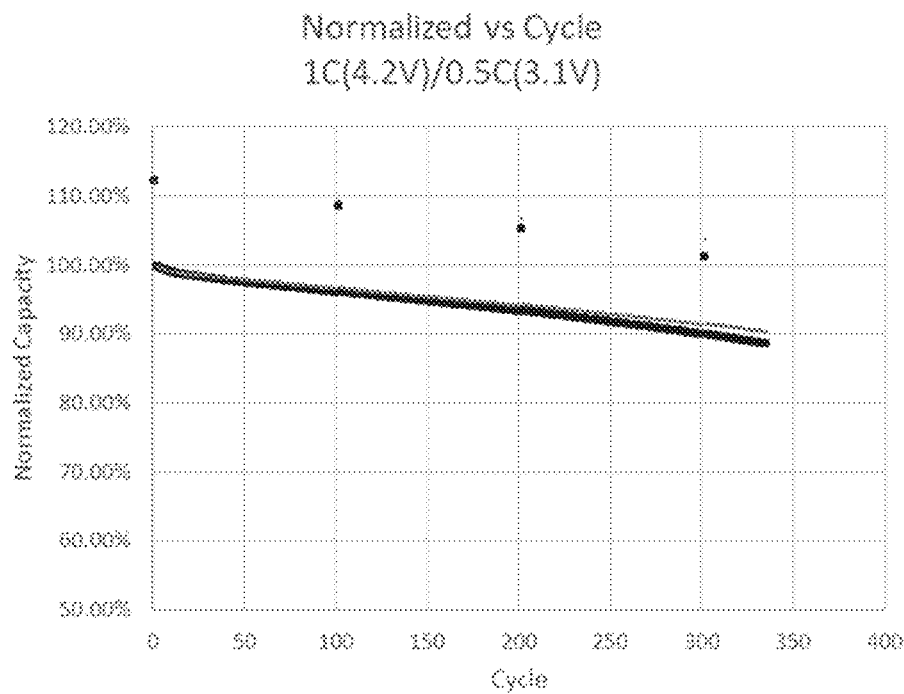

FIGS. 6A and 6B show Capacity Retention and Normalized Capacity Retention, respectively, for full cells with control anodes (darker line) and for full cells with anodes comprising Al$_2$O$_3$ coated Si (lighter line). The test programs were the same as those used for FIGS. 5A and 5B. The results show that cells with anodes comprising Al$_2$O$_3$ coated Si had better capacity retention than the cells with anodes comprising unmodified Si. The better capacity retention was also observed in the lower rate deep discharge cycles that were performed every 100 cycles.

Figure 7A:
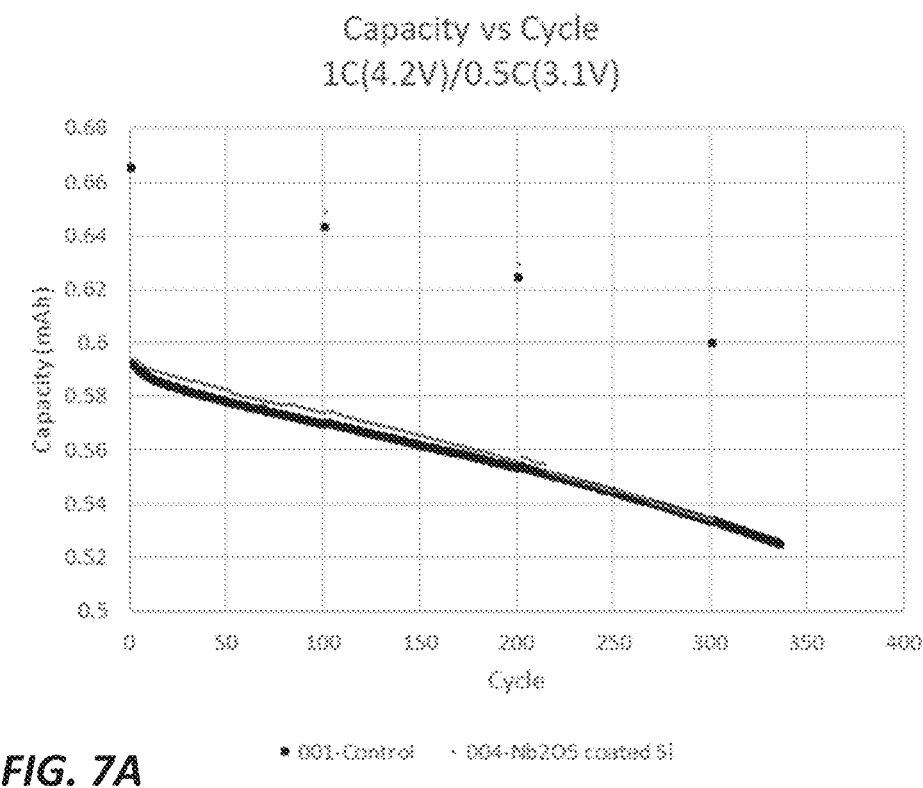
FIGS. 7A and 7B show Capacity Retention and Normalized Capacity Retention, respectively, for full cells with control anodes (darker line) and for full cells with anodes comprising $Nb_2O_5$ coated Si (lighter line).
Figure 7B:
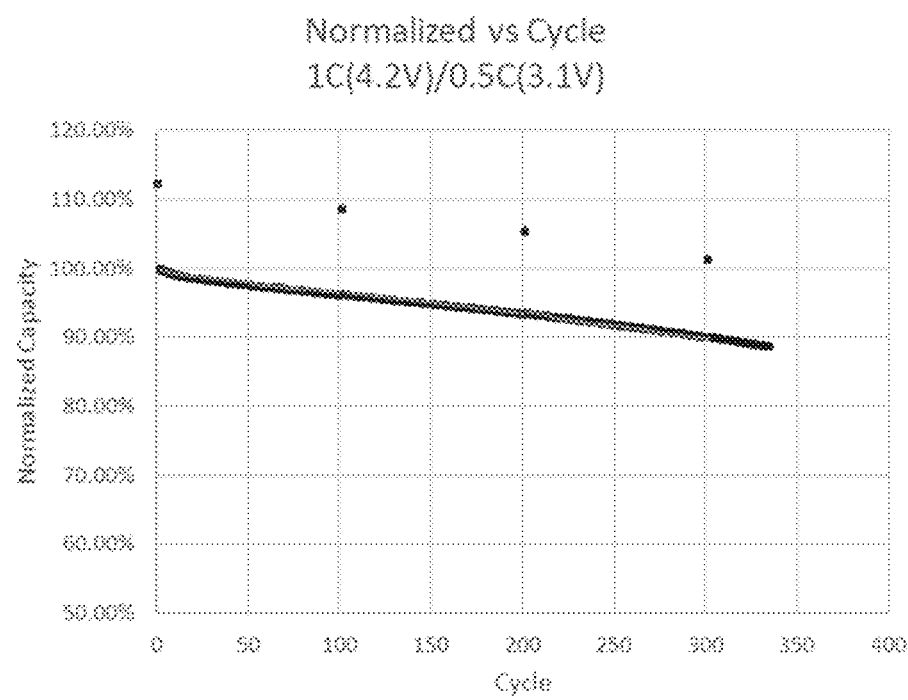

FIGS. 7A and 7B show Capacity Retention and Normalized Capacity Retention, respectively, for full cells with control anodes (darker line) and for full cells with anodes comprising Nb$_2$O$_5$ coated Si (lighter line). The test programs were the same as those used for FIGS. 5A and 5B. The results show that cells with anodes comprising Nb$_2$O$_5$ coated Si had similar capacity retention than the cells with anodes comprising unmodified Si.

Figure 8A:
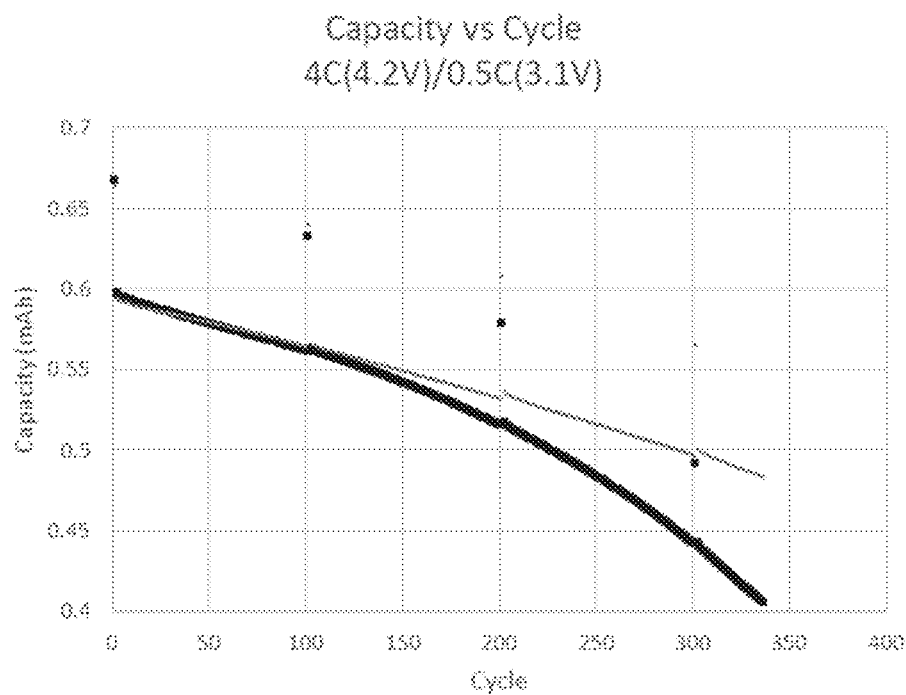
FIGS. 8A and 8B show Capacity Retention and Normalized Capacity Retention, respectively, for full cells with control anodes (darker line) and for full cells with anodes comprising $TiO_2$ coated Si (lighter line).
Figure 8B:
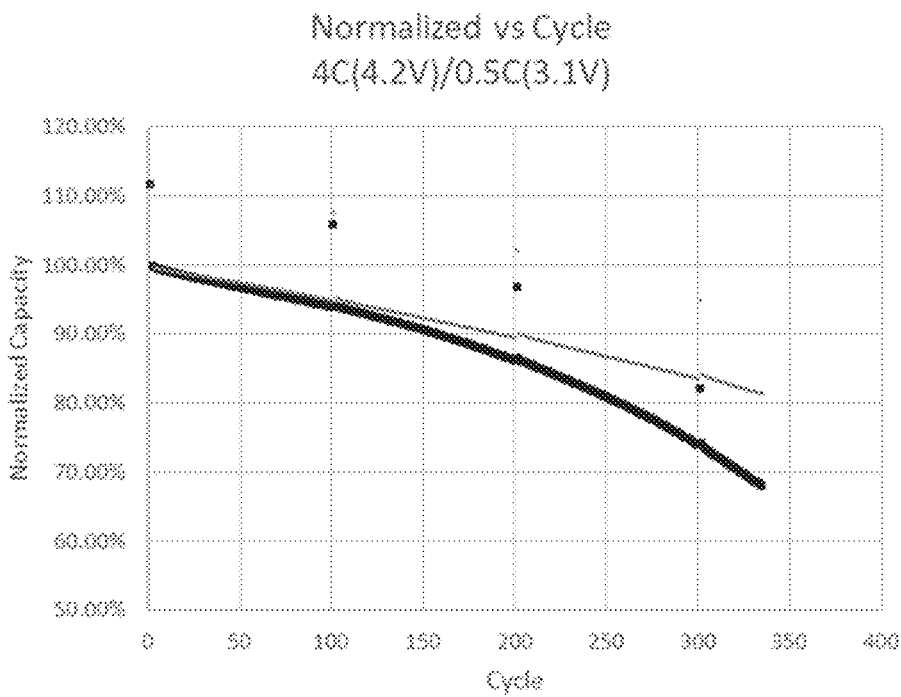

FIGS. 8A and 8B show Capacity Retention and Normalized Capacity Retention, respectively, for full cells with control anodes (darker line) and for full cells with anodes comprising TiO$_2$ coated Si (lighter line). The cycling regime for the cells included: (i) At the 1$^{st}$ cycle, charge at 0.33 C to 4.2 V until 0.05 C, rest 5 minutes, discharge at 0.33 C to 3 V, rest 5 minutes; and (ii) from the 2$^{nd}$ cycle, charge at 4 C to 4.2 V until 0.05 C, rest 5 minutes, discharge at 0.5 C to 3.1 V, rest 5 minutes. After every 99 cycles, the test conditions were repeated starting from cycle 1. The results show that cells with anodes comprising TiO$_2$ coated Si had significantly better capacity retention than the cells with anodes comprising unmodified Si. The better capacity retention was also observed in the lower rate deep discharge cycles that is performed every 100 cycles.

Figure 9A:
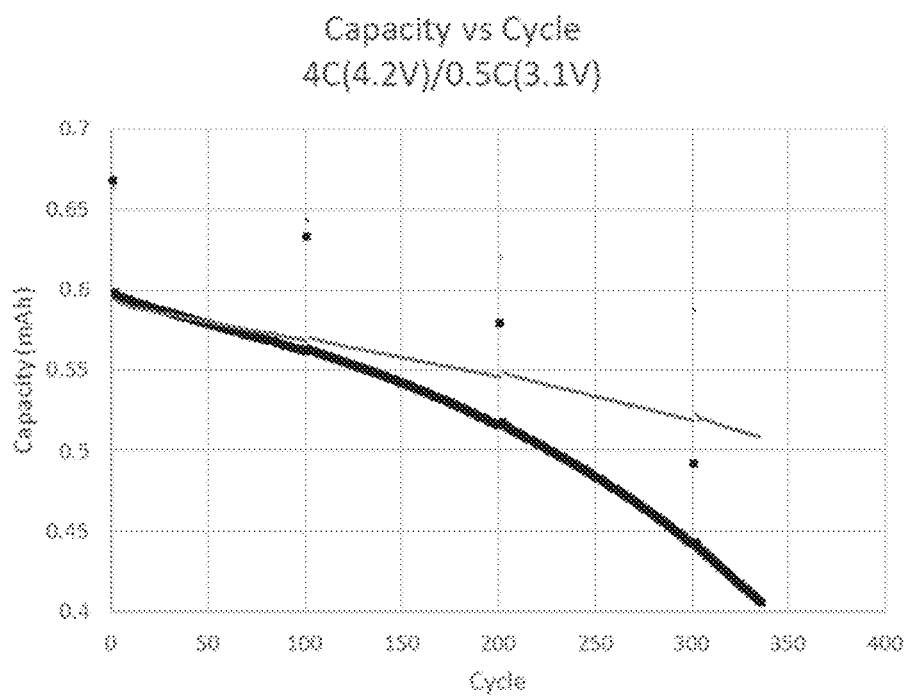
FIGS. 9A and 9B show Capacity Retention and Normalized Capacity Retention, respectively, for full cells with control anodes (darker line) and for full cells with anodes comprising $Al_2O_3$ coated Si (lighter line).
Figure 9B:
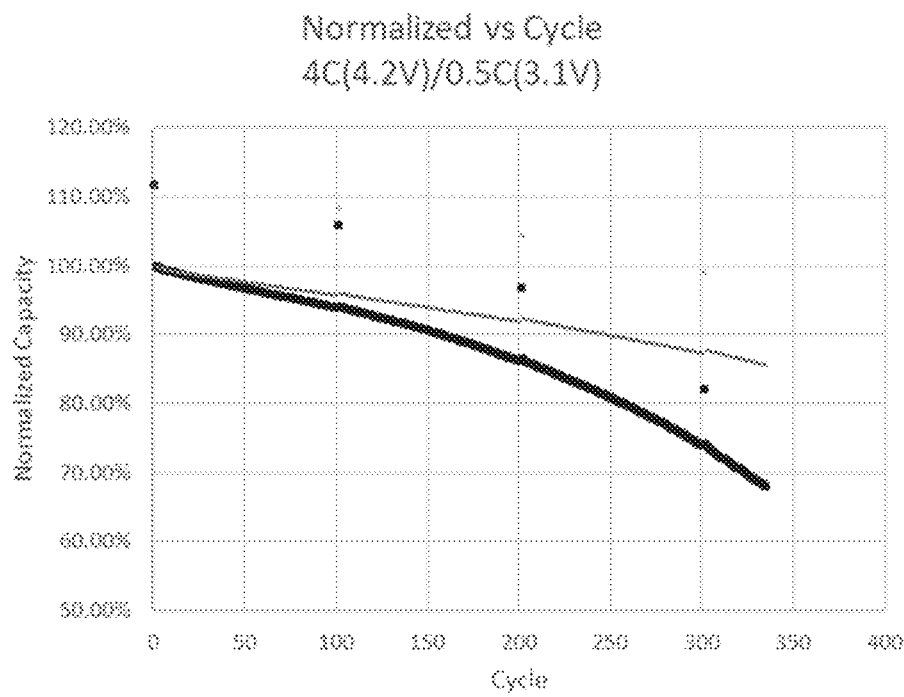

FIGS. 9A and 9B show Capacity Retention and Normalized Capacity Retention, respectively, for full cells with control anodes (darker line) and for full cells with anodes comprising Al$_2$O$_3$ coated Si (lighter line). The test programs were the same as those used for FIGS. 8A and 8B. The results show that cells with anodes comprising Al$_2$O$_3$ coated Si had significantly better capacity retention than the cells with anodes comprising unmodified Si. The better capacity retention was also observed in the lower rate deep discharge cycles that is performed every 100 cycles.

Figure 10A:
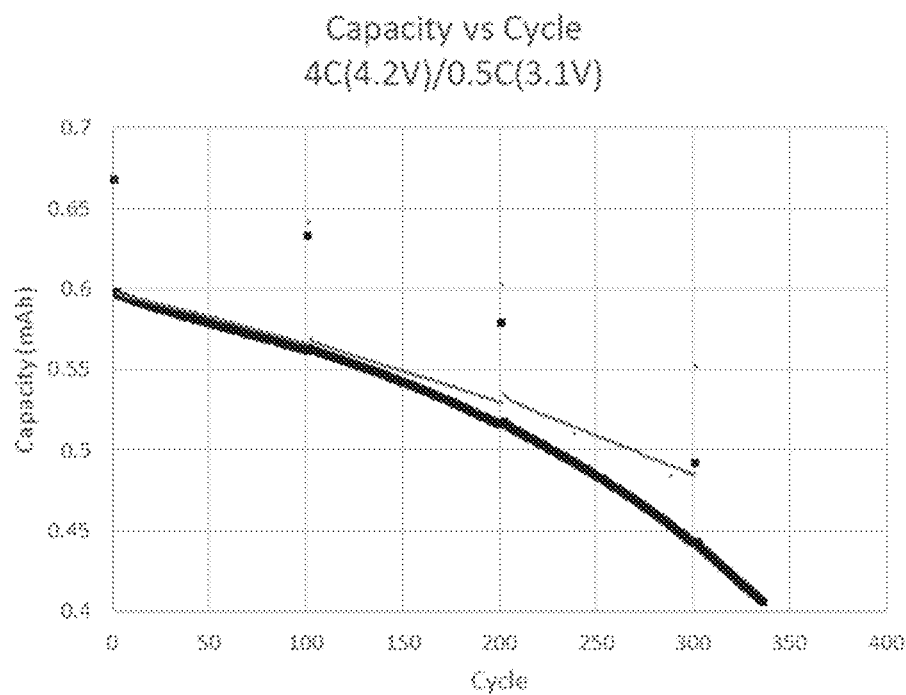
FIGS. 10A and 10B show Capacity Retention and Normalized Capacity Retention, respectively, for full cells with control anodes (darker line) and for full cells with anodes comprising $Nb_2O_5$ coated Si (lighter line).
Figure 10B:
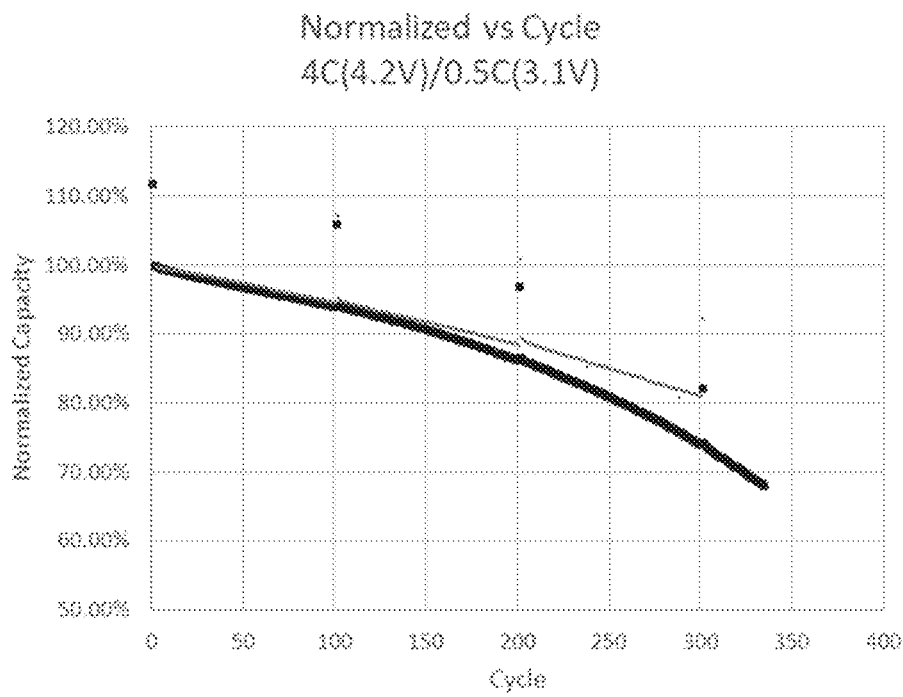

FIGS. 10A and 10B show Capacity Retention and Normalized Capacity Retention, respectively, for full cells with control anodes (darker line) and for full cells with anodes comprising Nb$_2$O$_5$ coated Si (lighter line). The test programs were the same as those used for FIGS. 8A and 8B. The results show that cells with anodes comprising Nb$_2$O$_5$ coated Si had significantly better capacity retention than the cells with anodes comprising unmodified Si. The better capacity retention was also observed in the lower rate deep discharge cycles that is performed every 100 cycles.

Figure 11A:
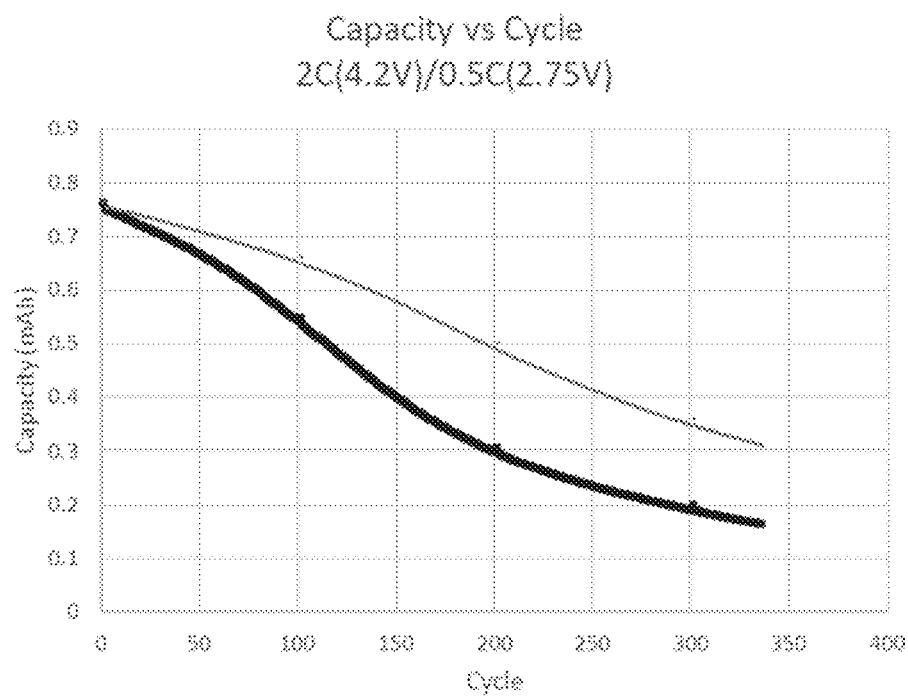
FIGS. 11A and 11B show Capacity Retention and Normalized Capacity Retention, respectively, for full cells with control anodes (darker line) and for full cells with anodes comprising $TiO_2$ coated Si (lighter line).
Figure 11B:
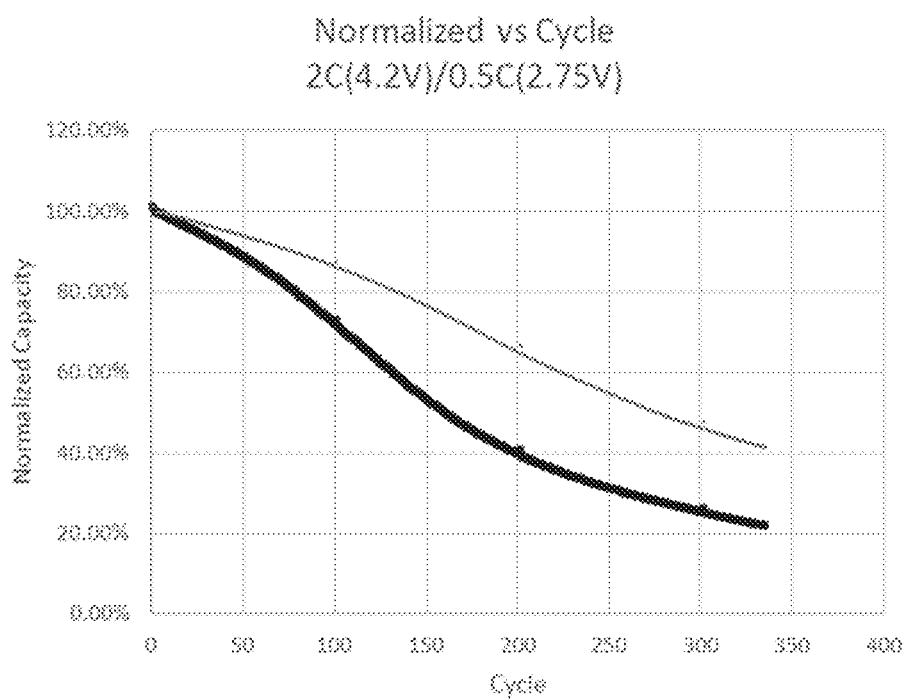

FIGS. 11A and 11B show Capacity Retention and Normalized Capacity Retention, respectively, for full cells with control anodes (darker line) and for full cells with anodes comprising TiO$_2$ coated Si (lighter line). The cycling regime for the cells included: (i) At the 1$^{st}$ cycle, charge at 0.33 C to 4.2 V until 0.05 C, rest 5 minutes, discharge at 0.33 C to 2.75 V, rest 5 minutes; and (ii) from the 2$^{nd}$ cycle, charge at 2C to 4.2 V until 0.05 C, rest 5 minutes, discharge at 0.5 C to 2.75 V, rest 5 minutes. After every 99 cycles, the tests were repeated starting from cycle 1. The results show that cells with anodes comprising TiO$_2$ coated Si had significantly better capacity retention than the cells with anodes comprising unmodified Si. The better capacity retention was also observed in the lower rate deep discharge cycles that is performed every 100 cycles.

Figure 12A:
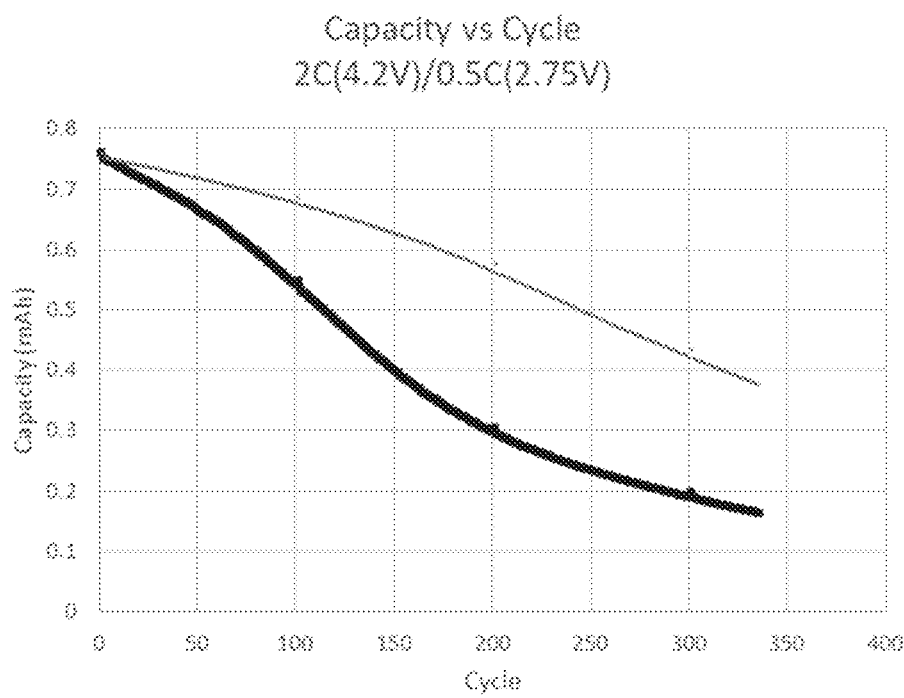
FIGS. 12A and 12B show Capacity Retention and Normalized Capacity Retention, respectively, for full cells with control anodes (darker line) and for full cells with anodes comprising $Al_2O_3$ coated Si (lighter line).
Figure 12B:
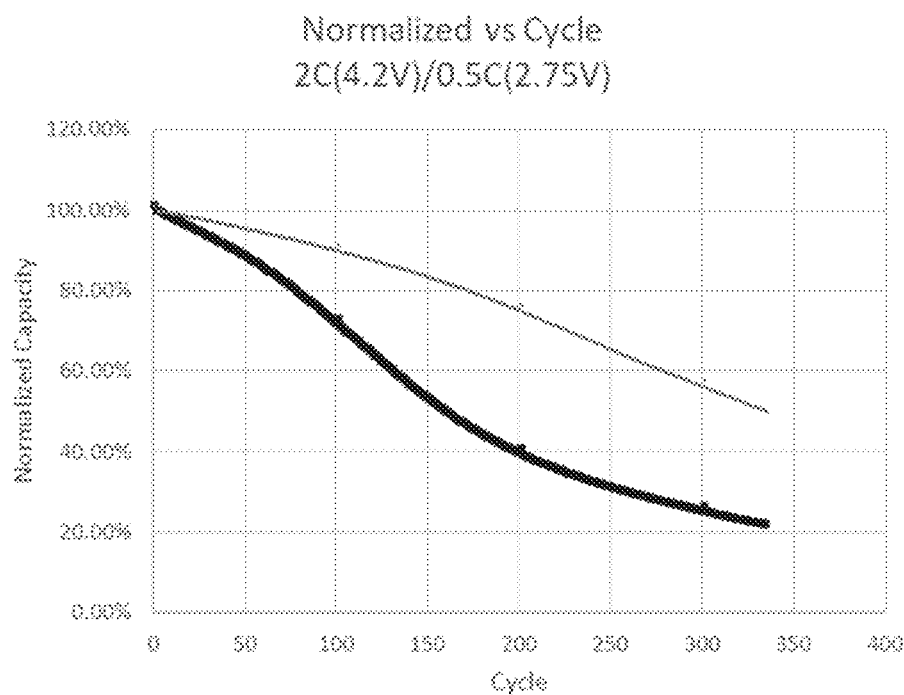

FIGS. 12A and 12B show Capacity Retention and Normalized Capacity Retention, respectively, for full cells with control anodes (darker line) and for full cells with anodes comprising Al$_2$O$_3$ coated Si (lighter line). The test programs were the same as those used for FIGS. 11A and 11B. The results show that cells with anodes comprising Al$_2$O$_3$ coated Si had significantly better capacity retention than the cells with anodes comprising unmodified Si. The better capacity retention was also observed in the lower rate deep discharge cycles that is performed every 100 cycles.

Figure 13A:
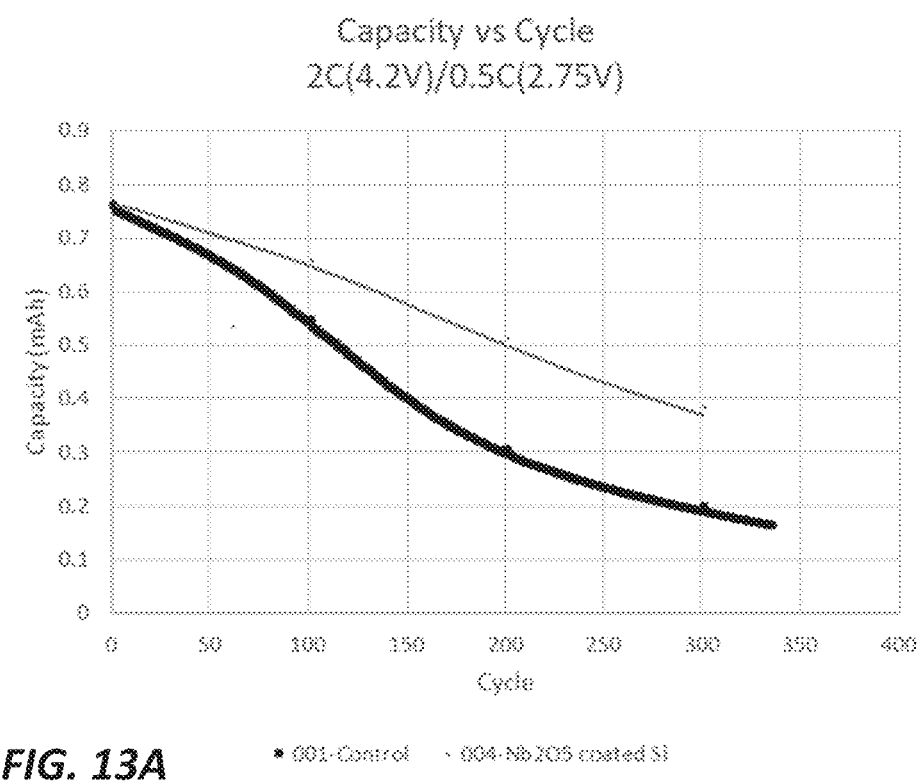
FIGS. 13A and 13B show Capacity Retention and Normalized Capacity Retention, respectively, for full cells with control anodes (darker line) and for full cells with anodes comprising $Nb_2O_5$ coated Si (lighter line).
Figure 13B:
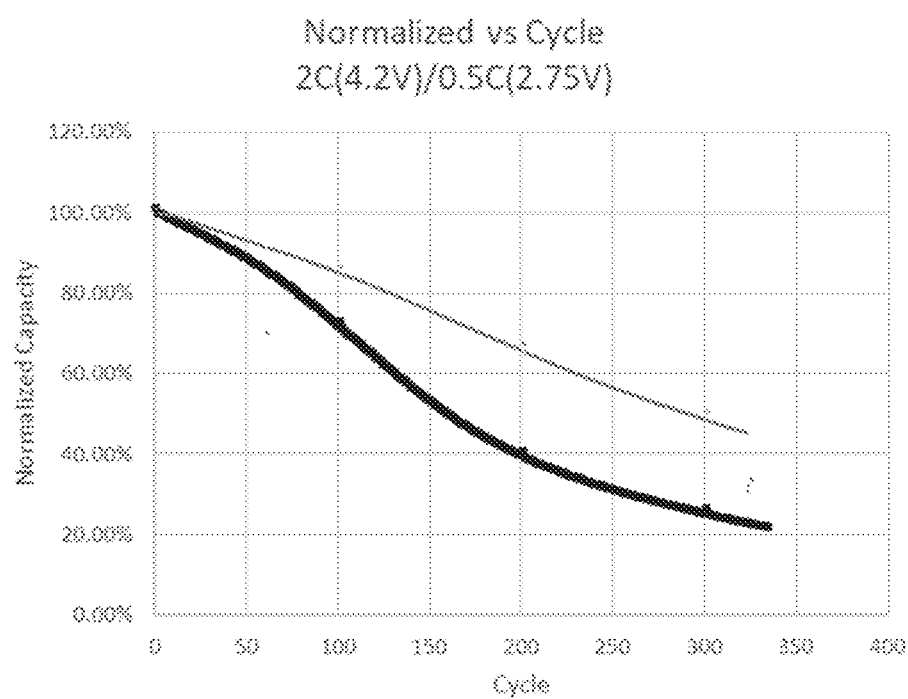

FIGS. 13A and 13B show Capacity Retention and Normalized Capacity Retention, respectively, for full cells with control anodes (darker line) and for full cells with anodes comprising Nb$_2$O$_5$ coated Si (lighter line). The test programs were the same as those used for FIGS. 11A and 11B. The results show that cells with anodes comprising Nb$_2$O$_5$ coated Si had significantly better capacity retention than the cells with anodes comprising unmodified Si. The better capacity retention was also observed in the lower rate deep discharge cycles that is performed every 100 cycles.

Various implementations coat a thin layer of metal oxide on the surface of Si powders followed by preparing carbon-coated Si-dominant thin-film anodes. The fine oxide layer (thin layer or nanoparticles) was fabricated by the deposition of a thin and uniform polymeric metal alkoxide layer on the surface of Si powders and then heat-treating the coated powders at 400° C. in an inert (e.g., argon) environment. The M-O-M network of the metal alkoxide (See FIG. 2) can passivate Si powder surfaces against the electrolyte. The $TiO_2$, $Al_2O_3$, and $Nb_2O_5$ thin layers or nanoparticles were coated on the surface of Si powders through chemical reactions in acidic conditions. The carbon coated Si-dominant thin film anodes were fabricated and these anodes showed clearly improved performance compared with reference anodes in Li-ion full pouch cells.

The use of thin oxide layer coated Si in electrodes for Li-ion batteries can lead to an improvement in the capacity retention because oxides can act as buffer layers for the large volume changes of Si during the charging-discharging process. Various implementations described herein of silicon-carbon composite films also introduce extra carbon shells. This layer can help further enhance the electrical conductivity. These multifunctional coating layers may help the formation of stable SEI on the Si surface, reduce and/or minimize interface impedance, and further buffer the volume changes during lithiation/delithiation processes. In addition, the coating layers can dissipate strain energy via atomic rearrangement of overcoordinated atoms, an effect most notable when the oxide coating is highly coordinated while also increasing the activation volume of the silicon core, reducing and/or preventing localized deformation from occurring. These increases in toughness and ductility can improve long-term stability of Si anodes in Li-ion batteries.

Various implementations described herein advantageously provide increased cycle life. Various implementations can also provide increased energy density, increased powder density, increased safety, and/or decreased electrolyte consumption Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of preparing an anode material comprising:
   providing silicon particles;
   forming a mixture comprising the silicon particles dispersed in a solvent; forming a suspension by adding metal alkoxide or metal aryloxide to the mixture;
   evaporating the solvent in the suspension to form metal alkoxide or metal aryloxide coated silicon particles; and
   heating the coated silicon particles to form metal oxide coated silicon particles;
   wherein the metal alkoxide and metal aryloxide are represented by M(OR)x, wherein
   M is a metal;
   each R is independently selected from the group consisting of methyl (Me), ethyl (Et), n-propyl (Prn), iso-propyl (Pri), n-butyl (Bun), sec-butyl (Bus), iso-butyl (Bui), and tert-butyl (But), phenyl, naphthyl, tolyl, and xylyl; and
   x is 1, 2, 3, 4, or 5; and wherein
   M is selected from the group consisting of K, Rb, Cs, Nb, Be, Ca, Sr, Ba, Fe, Cd, Co, Ni, Mn, Hg, Sm, Cr, Ln, Fe, Mo, W, Yln, Sn, Ce, Ge, Se, Th, Pb, Hf, Sb, V, Ta and U.

2. The method of claim 1, wherein the metal alkoxide is $Nb(OR)_5$.

3. The method of claim 1, wherein M is a Group 1 metal.

4. The method of claim 1, wherein M is Nb.

5. The method of claim 1, wherein M is a bivalent metal, a trivalent metal, a quadrivalent metal, a quinquevalent metal, or a sexavalent metal.

6. The method of claim 5, wherein the bivalent metal is selected from the group consisting of beryllium (Be) (II), calcium (Ca) (II), strontium (Sr) (II), barium (Ba) (II), iron (Fe) (II), cadmium (Cd) (II), cobalt (Co) (II), nickel (Ni) (II), manganese (Mn) (II), mercury (Hg) (II), and samarium (Sm) (II).

7. The method of claim 5, wherein the trivalent metal is selected from the group consisting of chromium (Cr) (Ill), lanthanum (Ln) (III), iron (Fe) (III), molybdenum (Mo) (Ill), tungsten (W) (III) and indium (In) (Ill).

8. The method of claim 5, wherein the quadrivalent metal is selected from the group consisting of tin (Sn) (IV), cerium (Ce) (IV), germanium (Ge) (IV), selenium (Se) (IV), thorium (Th) (IV), lead (Pb) (IV), and hafnium (Hf) (IV).

9. The method of claim 5, wherein the quinquevalent metal is selected from the group consisting of antimony (Sb) (V), vanadium (V) (V), tantalum (Ta) (V), and uranium (U) (V).

10. The method of claim 5, wherein the sexavalent metal is molybdenum (Mo) (VI) or tungsten (W) (VI).

11. The method of claim 1, wherein the metal oxide is a transition metal oxide.

12. A method of forming an anode comprising:
    providing the metal oxide coated silicon particles prepared using the method of claim 1;
    forming an anode active material precursor comprising the metal oxide coated silicon particles dispersed in a carbon precursor;
    coating the anode active material precursor onto a substrate to form a green active material film;
    drying the green active material film; and
    heating the green active material film to form a silicon-carbon composite anode material film.

13. The method of claim 12, wherein the carbon precursor comprises polyamic acid resin.

14. The method of claim 12, wherein the anode active material precursor further comprises graphite particles.

15. A method of making an electrochemical device, the method comprising:
    providing a first electrode comprising the silicon-carbon composite anode material film formed using the method of claim 12;
    providing a second electrode; and
    providing electrolyte.

16. The method of claim 15, wherein the electrochemical device is a lithium-ion battery.

17. The method of claim 15, wherein the second electrode is selected from the group consisting of:
    Ni-rich $LiNi_xCo_yMn_zO_2$, wherein 0≤x, y, z<1,
    Ni-rich $Li[Ni_xCo_yAl_{1-x-y}]O_2$, wherein 0≤x, y, z<1,
    Li-rich $xLi_2MnO_3 \cdot (1-x)LiNi_aCo_bMn_cO_2$, wherein 0<x<1 and a+b+c=1,
    Ni-rich $LiNi_{1-x}M_xO_2$, wherein M comprises Co, Mn, or Al,
    Li-rich layered $LiNi_{1-x}M_{1-x}O_2$, wherein M comprises Co, Mn, or Ni, a high-voltage spinel $LiNi_{0.5}Mn_{1.5}O_4$, and
a polyanionic compound comprising a phosphate, a sulfate, or a silicate.

\* \* \* \* \*

UNITED STATES PATENT AND TRADEMARK OFFICE
CERTIFICATE OF CORRECTION

| | | |
|---|---|---|
| PATENT NO. | : 11,631,841 B2 | Page 1 of 1 |
| APPLICATION NO. | : 16/722746 | |
| DATED | : April 18, 2023 | |
| INVENTOR(S) | : Ji et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this
Thirty-first Day of December, 2024

Derrick Brent
*Acting Director of the United States Patent and Trademark Office*